US008214151B2

(12) United States Patent
Duenckel et al.

(10) Patent No.: US 8,214,151 B2
(45) Date of Patent: Jul. 3, 2012

(54) METHODS OF IDENTIFYING HIGH NEUTRON CAPTURE CROSS SECTION DOPED PROPPANT IN INDUCED SUBTERRANEAN FORMATION FRACTURES

(75) Inventors: Robert Duenckel, Southlake, TX (US); Harry D. Smith, Jr., Montgomery, TX (US); Michael P. Smith, Montgomery, TX (US)

(73) Assignee: Carbo Ceramics Inc., Irving, TX (US)

( * ) Notice: Subject to any disclaimer, the term of this patent is extended or adjusted under 35 U.S.C. 154(b) by 563 days.

(21) Appl. No.: 12/425,884

(22) Filed: Apr. 17, 2009

(65) Prior Publication Data

US 2009/0210161 A1 Aug. 20, 2009

Related U.S. Application Data

(63) Continuation-in-part of application No. 12/358,168, filed on Jan. 22, 2009, now Pat. No. 8,100,177.

(51) Int. Cl.
*G01V 1/40* (2006.01)
*G01V 5/04* (2006.01)
*G01V 5/10* (2006.01)
*E21B 47/00* (2012.01)

(52) U.S. Cl. .............. 702/8; 702/6; 702/13; 250/269.6; 166/250.01

(58) Field of Classification Search ............ 702/6, 8, 702/13; 250/269.6; 166/250.01
See application file for complete search history.

(56) References Cited

U.S. PATENT DOCUMENTS

| | | |
|---|---|---|
| 3,240,938 A | 3/1966 | Hall, Jr. |
| 3,492,147 A | 1/1970 | Young et al. |
| 3,929,191 A | 12/1975 | Graham et al. |
| 3,943,362 A | 3/1976 | Peelman |

(Continued)

FOREIGN PATENT DOCUMENTS

CN  102007267  4/2011

(Continued)

OTHER PUBLICATIONS

International Search Report mailed Feb. 27, 2009, by the ISA/US, in connection with International Application No. PCT/US2009/031878.

(Continued)

*Primary Examiner* — Andrew Schechter
*Assistant Examiner* — L. Anderson
(74) *Attorney, Agent, or Firm* — Haynes and Boone, LLP

(57) ABSTRACT

Methods are provided for determining the locations and heights of fractures in a subterranean formation using a neutron-emitting logging tool. Utilizing predetermined relationships (1) between logging tool count rates and associated apparent formation hydrogen index values and (2) between logging tool count rate ratios and associated apparent formation hydrogen index values, the methods detect the presence and heights in the formation of proppant containing high thermal neutron capture cross section material in a manner substantially eliminating proppant determination uncertainty resulting from a prior change in formation hydrogen index values. A second, associated, method employing logging tool count rates and count rate ratios to determine the presence of proppant containing high thermal neutron capture cross section absorbers utilizes a crossplot of count rate versus ratio. Logged intervals containing no proppant will fall on a trend/trendline on the crossplot, whereas logged intervals containing proppant will fall off from this trend/trendline.

52 Claims, 15 Drawing Sheets

U.S. PATENT DOCUMENTS

| | | |
|---|---|---|
| 4,021,666 A | 5/1977 | Allen |
| 4,052,613 A | 10/1977 | Murphy et al. |
| 4,068,718 A | 1/1978 | Cooke, Jr. et al. |
| 4,078,174 A | 3/1978 | Goldman |
| 4,092,536 A | 5/1978 | Smith |
| 4,288,696 A | 9/1981 | Peelman et al. |
| 4,427,068 A | 1/1984 | Fitzgibbon |
| 4,440,866 A | 4/1984 | Lunghofer et al. |
| 4,495,604 A | 1/1985 | Clavier et al. |
| 4,585,064 A | 4/1986 | Graham et al. |
| 4,642,460 A | 2/1987 | Wallace |
| 4,658,899 A | 4/1987 | Fitzgibbon |
| 4,731,531 A | 3/1988 | Handke |
| 4,760,252 A | 7/1988 | Albats et al. |
| 4,825,073 A | 4/1989 | Smith, Jr. et al. |
| 4,879,181 A | 11/1989 | Fitzgibbon |
| 4,894,285 A | 1/1990 | Fitzgibbon |
| 4,926,940 A | 5/1990 | Stromswold |
| 5,156,804 A | 10/1992 | Halverson et al. |
| 5,188,175 A | 2/1993 | Sweet |
| 5,322,126 A | 6/1994 | Scott, III |
| 5,404,010 A * | 4/1995 | Anderson et al. ............. 250/260 |
| 5,410,152 A | 4/1995 | Gadeken |
| 5,441,110 A | 8/1995 | Scott, III |
| 5,536,938 A | 7/1996 | Mills et al. |
| 5,572,021 A | 11/1996 | Heathman et al. |
| 5,635,712 A | 6/1997 | Scott, III et al. |
| 6,207,953 B1 | 3/2001 | Wilson |
| 6,389,367 B1 | 5/2002 | Plasek |
| 6,725,926 B2 | 4/2004 | Nguyen et al. |
| 7,036,591 B2 | 5/2006 | Cannan et al. |
| 2006/0192096 A1 | 8/2006 | Radtke |
| 2007/0011115 A1 | 1/2007 | Smith, Jr. et al. |
| 2007/0034373 A1 | 2/2007 | McDaniel et al. |
| 2008/0009425 A1 | 1/2008 | Pershikova |
| 2009/0205825 A1 | 8/2009 | Smith, Jr. et al. |
| 2011/0001040 A1 | 1/2011 | Smith, Jr. et al. |

FOREIGN PATENT DOCUMENTS

| | | |
|---|---|---|
| WO | WO 2005/103446 | 11/2005 |
| WO | WO 2007/019585 | 2/2007 |
| WO | WO 2009/105306 | 8/2007 |
| WO | WO 2010/120494 | 10/2010 |
| WO | WO 2011/162938 | 12/2011 |

OTHER PUBLICATIONS

Written Opinion mailed Feb. 27, 2009, by the ISA/US, in connection with International Application No. PCT/US2009/031878.

W.E. Schultz et al.; *Experimental Basis for a New Borehole Corrected Pulsed Neutron Capture Logging System (TMD)*; SPWLA Publications.

H.D Smith, Jr. et al.; *Applications of a New Borehole Corrected Pulsed Neutron Capture Logging System (TMD)*; SPWLA Publications.

J.C. Buchanan et al.; *Applications of TMD\* Pulsed Neutron Logs in Unusual Downhole Logging Environments*; SPWLA Publications.

Mark Mulkern et al, A Green Alternative for Determination of Frac Height and Proppant Distribution, SPE 138500, Oct. 12-14, 2010, 9 pages, SPE Eastern Regional Meeting held in Morgantown, West Virginia.

International Preliminary Examination Authority—US, PCT Written Opinion of the International Preliminary Examination Authority, mailed Nov. 22, 2011, PCT/US10/29207; 11 pages, Alexandria, Virginia USA.

International Search Report mailed Jun. 1, 2010, by the ISA/US, in connection with International Application No. PCT/US2010/029207.

International Preliminary Report on Patentability mailed Sep. 8, 2010, by the IPEA/US, in connection with International Application No. PCT/US2009/031878.

International Search Report mailed Sep. 16, 2011, by the ISA/US, in connection with International Application No. PCT/US2011/039236.

Written Opinion mailed Sep. 16, 2011, by the ISA/US, in connection with International Application No. PCT/US2011/039236.

Office Action mailed Aug. 31, 2010, by the USPTO, in connection with U.S. Appl. No. 12/358,168.

Office Action mailed Apr. 8, 2011, by the USPTO, in connection with U.S. Appl. No. 12/358,168.

Notice of Allowance mailed Sep. 27, 2011, by the USPTO, in connection with U.S. Appl. No. 12/358,168.

Office Action mailed Dec. 7, 2011, by the USPTO, in connection with U.S. Appl. No. 12/820,576.

Correspondence from foreign counsel regarding Office Action dated Dec. 14, 2011, issued by the Eurasian Patent Office, regarding Eurasian Patent App No. 201001336.

\* cited by examiner

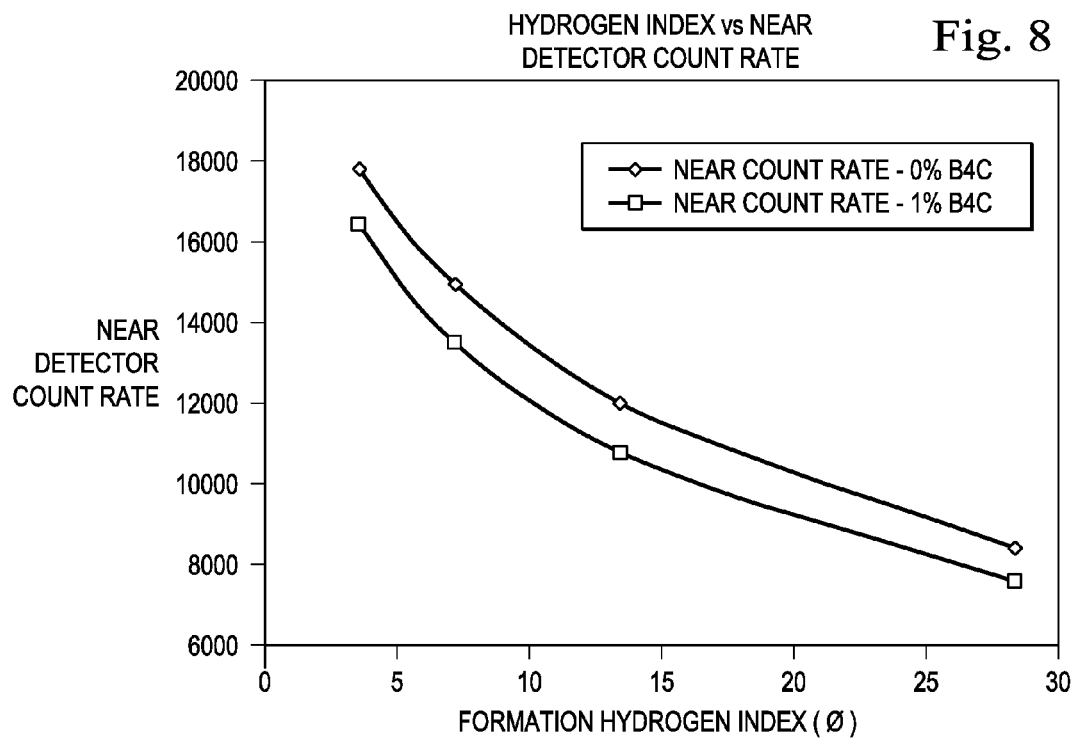
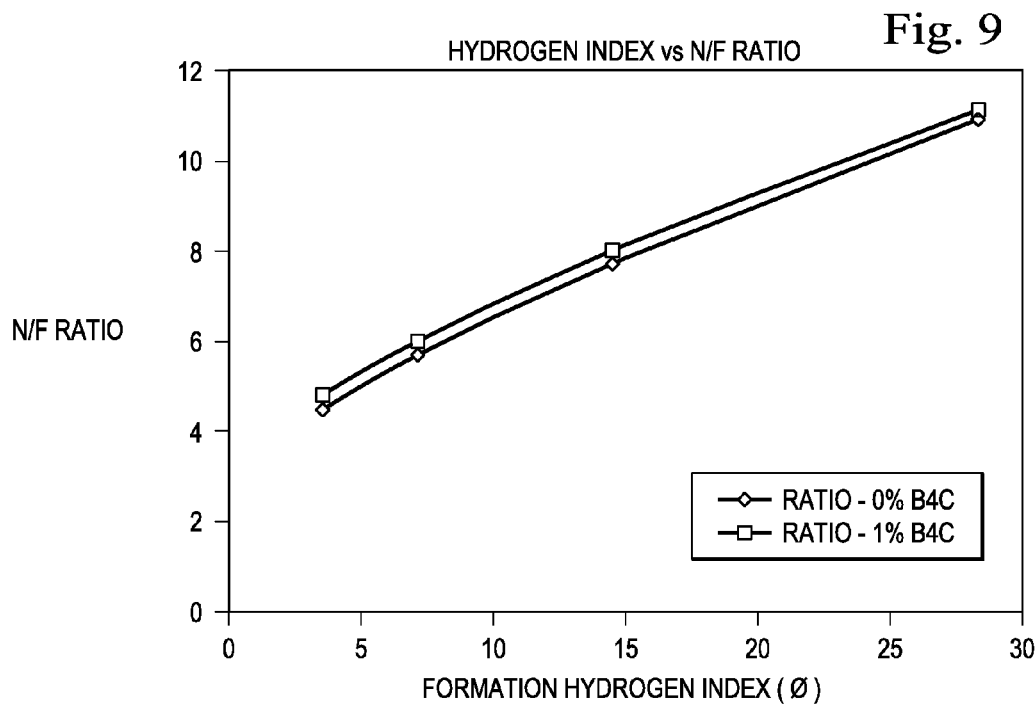

METHODS OF IDENTIFYING HIGH NEUTRON CAPTURE CROSS SECTION DOPED PROPPANT IN INDUCED SUBTERRANEAN FORMATION FRACTURES

CROSS-REFERENCE TO RELATED PATENT APPLICATIONS

This application is a continuation-in-part of U.S. application Ser. No. 12/358,168 filed on Jan. 22, 2009, entitled "Method of Logging a Well Using a Thermal Neutron Absorbing Material" and claiming the benefit of the filing date of U.S. Provisional Application Ser. No. 61/030,125 filed on Feb. 20, 2008 and entitled "Method of Logging a Well Using a Thermal Neutron Absorbing Material", each of these prior applications being hereby incorporated herein by reference in its entirety.

BACKGROUND

The present invention relates to hydraulic fracturing operations, and more specifically to methods for identifying an induced subterranean formation fracture using neutron emission-based logging tools.

In order to more effectively produce hydrocarbons from downhole formations, and especially in formations with low porosity and/or low permeability, induced fracturing (called "frac operations", "hydraulic fracturing", or simply "fracing") of the hydrocarbon-bearing formations has been a commonly used technique. In a typical frac operation, fluids are pumped downhole under high pressure, causing the formations to fracture around the borehole, creating high permeability conduits that promote the flow of the hydrocarbons into the borehole. These frac operations can be conducted in horizontal and deviated, as well as vertical, boreholes, and in either intervals of uncased wells, or in cased wells through perforations.

In cased boreholes in vertical wells, for example, the high pressure fluids exit the borehole via perforations through the casing and surrounding cement, and cause the formations to fracture, usually in thin, generally vertical sheet-like fractures in the deeper formations in which oil and gas are commonly found. These induced fractures generally extend laterally a considerable distance out from the wellbore into the surrounding formations, and extend vertically until the fracture reaches a formation that is not easily fractured above and/or below the desired frac interval. The directions of maximum and minimum horizontal stress within the formation determine the azimuthal orientation of the induced fractures. Normally, if the fluid, sometimes called slurry, pumped downhole does not contain solids that remain lodged in the fracture when the fluid pressure is relaxed, then the fracture re-closes, and most of the permeability conduit gain is lost.

These solids, called proppants, are generally composed of sand grains or ceramic particles, and the fluid used to pump these solids downhole is usually designed to be sufficiently viscous such that the proppant particles remain entrained in the fluid as it moves downhole and out into the induced fractures. Prior to producing the fractured formations, materials called "breakers", which are also pumped downhole in the frac fluid slurry, reduce the viscosity of the frac fluid after a desired time delay, enabling these fluids to be easily removed from the fractures during production, leaving the proppant particles in place in the induced fractures to keep them from closing and thereby substantially precluding production fluid flow therethrough.

The proppants may also be placed in the induced fractures with a low viscosity fluid in fracturing operations referred to as "water fracs". The fracturing fluid in water fracs is water with little or no polymer or other additives. Water fracs are advantageous because of the lower cost of the fluid used. Also when using cross-linked polymers, it is essential that the breakers be effective or the fluid cannot be recovered from the fracture effectively restricting flow of formation fluids. Water fracs, because the fluid is not cross-linked, do not rely on effectiveness of breakers.

Proppants commonly used are naturally occurring sands, resin coated sands, and ceramic proppants. Ceramic proppants are typically manufactured from naturally occurring materials such as kaolin and bauxitic clays, and offer a number of advantages compared to sands or resin coated sands principally resulting from the compressive strength of the manufactured ceramics and their highly spherical particle configuration.

Although induced fracturing has been a highly effective tool in the production of hydrocarbon reservoirs, there is nevertheless usually a need to determine the interval(s) that have been fractured after the completion of the frac operation. It is possible that there are zones within the desired fracture interval(s) which were ineffectively fractured, either due to anomalies within the formation or problems within the borehole, such as ineffective or blocked perforations. It is also desirable to know if the fractures extend vertically across the entire desired fracture interval(s), and also to know whether or not any fracture(s) may have extended vertically outside the desired interval. In the latter case, if the fracture has extended into a water-bearing zone, the resulting water production would be highly undesirable. In all of these situations, knowledge of the location of both the fractured and unfractured zones would be very useful for planning remedial operations in the subject well and/or in utilizing the information gained for planning frac jobs on future candidate wells.

There have been several methods used in the past to help locate the successfully fractured intervals and the extent of the fractures in frac operations. For example, acoustic well logs have been used. Acoustic well logs are sensitive to the presence of fractures, since fractures affect the velocities and magnitudes of compressional and shear acoustic waves traveling in the formation. However, these logs are also affected by many other parameters, such as rock type, formation porosity, pore geometry, borehole conditions, and presence of natural fractures in the formation. Another previously utilized acoustic-based fracture detection technology is the use of "crack noise", wherein an acoustic transducer placed downhole immediately following the frac job actually "listens" for signals emanating from the fractures as they close after the frac pressure has been relaxed. This technique has had only limited success due to: (1) the logistical and mechanical problems associated with having to have the sensor(s) in place during the frac operation, since the sensor has to be activated almost immediately after the frac operation is terminated, and (2) the technique utilizes the sound generated as fractures close, therefore effective fractures, which are the ones that have been propped open to prevent closure thereof, often do not generate noise signals as easy to detect as the signals from unpropped fractures, which can generate misleading results.

Arrays of tilt meters at the surface have also been previously utilized to determine the presence of subterranean fractures. These sensors can detect very minute changes in the contours of the earth's surface above formations as they are being fractured, and these changes across the array can often be interpreted to locate fractured intervals. This technique is very expensive to implement, and does not generally have the vertical resolution to be able to identify which zones within the frac interval have been fractured and which zones have not, nor can this method effectively determine if the fracture has extended vertically outside the desired vertical fracture interval(s).

Microseismic tools have also been previously utilized to map fracture locations and geometries. In this fracture location method, a microseismic array is placed in an offset well near the well that is to be hydraulically fractured. During the frac operations the microseismic tool records microseisms that result from the fracturing operation. By mapping the locations of the mictoseisms it is possible to estimate the height and length of the induced fracture. However, this process is expensive and requires a nearby available offset well.

Other types of previously utilized fracture location detection techniques employ nuclear logging methods. A first such nuclear logging method uses radioactive materials which are mixed at the well site with the proppant and/or the frac fluid just prior to the proppant and/or frac fluid being pumped into the well. After such pumping, a logging tool is moved through the wellbore to detect and record gamma rays emitted from the radioactive material previously placed downhole, the recorded radioactivity-related data being appropriately interpreted to detect the fracture locations. A second previously utilized nuclear logging method is performed by pumping one or more stable isotopes downhole with the proppant in the frac slurry, such isotope material being capable of being activated (i.e., made radioactive) by a neutron-emitting portion of a logging tool run downhole after the fracing process. A spectroscopic gamma ray detector portion of the tool detects and records gamma rays from the resulting decay of the previously activated "tracer" material nuclei as the tool is moved past the activated material. The gamma spectra are subsequently analyzed to identify the activated nuclei, and thus the frac zones. One or both of these previously utilized nuclear-based techniques for locating subterranean fractures has several known limitations and disadvantages which include:

1. The need to pump radioactive material downhole or to create radioactivity downhole by activating previously non-radioactive material within the well;
2. A requirement for complex and/or high resolution gamma ray spectroscopy detectors and spectral data analysis methods;
3. Undesirably shallow depth of fracture investigation capability;
4. Possible hazards resulting from flowback to the surface of radioactive proppants or fluids;
5. Potential for radioactivity contamination of equipment at the well site;
6. The need to prepare the proppant at the well site to avoid an undesirable amount of radioactive decay of proppant materials prior to performance of well logging procedures;
7. The possibility of having excess radioactive material on the surface which cannot be used at another well;
8. The requirement for specialized logging tools which are undesirably expensive to run;
9. The requirement for undesirably slow logging tool movement speeds through the wellbore; and
10. The need for sophisticated gamma ray spectral deconvolution or other complex data processing procedures.

As can be seen from the foregoing, a need exists for subterranean fracture location detection methods which alleviate at least some of the above-mentioned problems, limitations and disadvantages associated with previously utilized fracture location detection techniques as generally described above.

BRIEF DESCRIPTION OF THE DRAWINGS

FIG. 5A is a graph of near and far detector count rates as a function of the modeled outer radius of the formation containing a fracture. FIG. 5B is a graph of near and far detector count rates modeled for a compensated neutron tool in the "para" orientation, in response to doped proppant located in differential fracture volume elements placed radially outward from the wellbore casing.

FIGS. 6A and 6B show for detectors at three spacings from the source, the decay curve data before (FIG. 6A) and after (FIG. 6B) proppant doped with boron carbide is placed in fractures, together with the computed formation and borehole decay components in both equation and graphical representations. In FIGS. 6A-6C, the upper (highest count rate) decay curves and components are from the near detector, the intermediate decay data is from the far detector, and the lowest count rate decay data is from the xfar detector.

FIG. 7A is an example of a well log obtained from a compensated neutron tool with three thermal neutron detectors (near, far, and xfar detectors respectively carried on the tool at progressively greater distances above its neutron generating portion). A pulsed neutron capture tool with a capture gamma ray detector or a thermal neutron detector would generate a well log similar to FIG. 7B. Under normal logging conditions a pulsed neutron capture tool has at least two detectors, a near detector and a far detector, and each detector generates a well log.

FIG. 8 is a plot of the functional relationship between the thermal neutron count rate measured in one detector in a compensated neutron tool as a function of the hydrogen index of downhole formations with no fracture present, assuming the borehole conditions illustrated in FIG. 3A. Also shown is the functional relationship between the same parameters with 1% $B_4C$ tagged proppant in a 1.0 cm wide induced fracture in the formation.

FIG. 9 is a plot of the functional relationship between the ratio of thermal neutron count rates measured in two different spaced detectors in a compensated neutron tool as a function of the hydrogen index of downhole formations with no fracture present, assuming the borehole conditions illustrated in FIG. 3A. Also shown is the functional relationship between the same parameters with 1% $B_4C$ tagged proppant in a 1.0 cm wide induced fracture in the formation.

DETAILED DESCRIPTION

Figure 1:
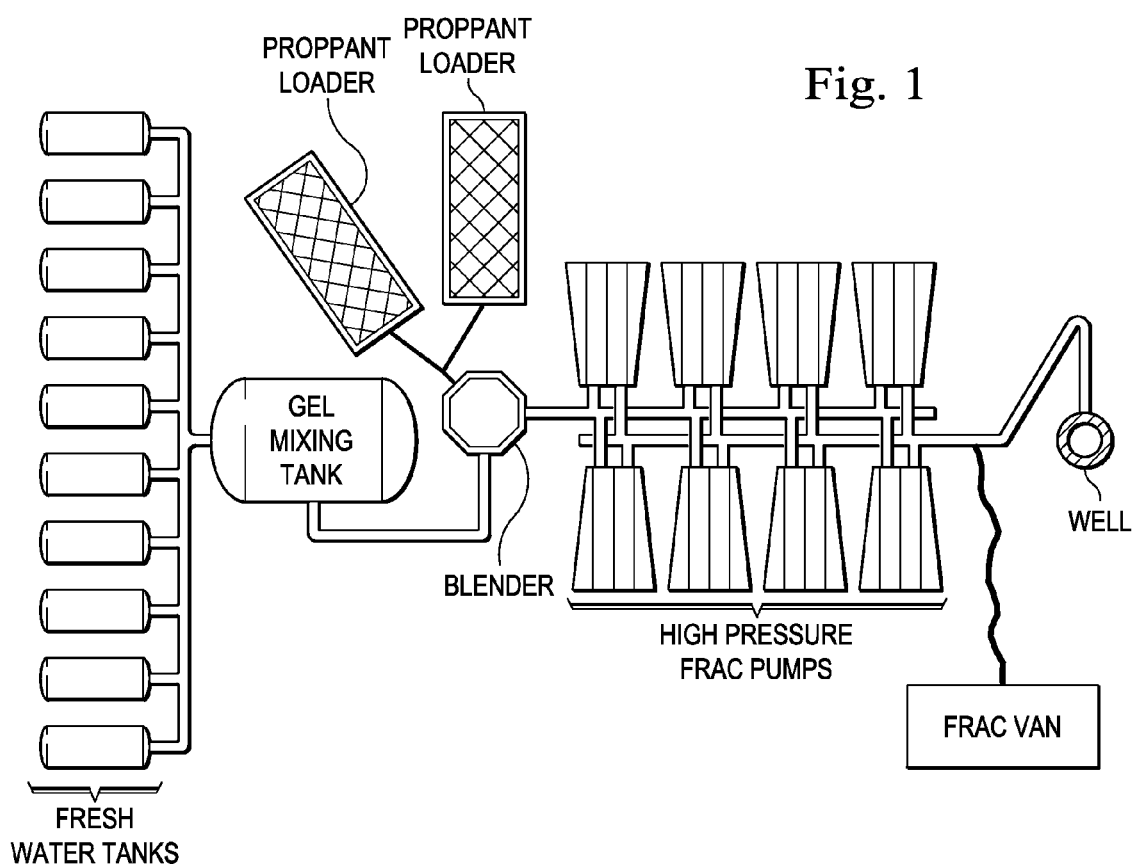
FIG. 1 is a schematic diagram of a wellsite frac layout.

The methods described herein do not use complex and/or high resolution gamma ray spectroscopy detectors. In addition, spectral data analysis methods are not required, and the depth of investigation is deeper than nuclear techniques employing downhole neutron activation. There is no possible hazard resulting from flowback to the surface of radioactive proppants or fluids, nor the contamination of equipment at the wellsite. The logistics of the operation are also very simple: (1) the proppant can be prepared well in advance of the required frac operations without worrying about radioactive decay associated with delays, (2) there are no concerns related to radiation exposure to the proppant during proppant transport and storage, (3) any excess proppant prepared for one frac job could be used on any subsequent frac job, and (4) the logging tools required are widely available and generally inexpensive to run. Also, slow logging speed is not an issue and there is no need for sophisticated gamma ray spectral deconvolution or other complex data processing (other than possible log normalization).

Moreover, the cost of the procedure when using neutron or compensated neutron tools is much lower than methods requiring expensive tracer materials, sophisticated detection equipment, high cost logging tools, or sophisticated data processing.

Embodiments of the present invention include a method for determining the location and height of a fracture in a subterranean formation using a pulsed neutron capture tool ("PNC"), a compensated neutron tool, or a single detector neutron tool. The method includes obtaining a pre-fracture data set, hydraulically fracturing the formation with a slurry that includes a liquid and a proppant in which all or a fraction of such proppant includes a thermal neutron absorbing material, obtaining a post-fracture data set, comparing the pre-fracture data set and the post-fracture data set to determine the location of the proppant, and correlating the location of the proppant to a depth measurement of the borehole to determine the location and height of the fracture.

The pre-fracture and post-fracture data sets are each obtained by lowering into a borehole traversing a subterranean formation, a neutron emitting tool including a continuous or pulsed fast neutron source and one or more thermal neutron or gamma ray detectors, emitting neutrons from the neutron source into the borehole and formation, and detecting in the borehole region thermal neutrons or capture gamma rays resulting from nuclear reactions of the source neutrons with elements in the borehole region and subterranean formation. For purposes of this application, the term "borehole region" includes the logging tool, the borehole fluid, the tubulars in the wellbore and any other annular material such as cement that is located between the formation and the tubular(s) in the wellbore.

According to certain embodiments using a PNC tool, the pre-fracture and post-fracture data sets are used to distinguish proppant in the formation from proppant in the wellbore.

According to an embodiment of the present invention which utilizes a PNC tool, the PNC logging tool generates data that includes log count rates, computed formation thermal neutron capture cross-sections, computed borehole thermal neutron capture cross-sections, and computed formation and borehole decay component count rate related parameters.

According to an embodiment of the present invention which utilizes a compensated neutron tool, the compensated neutron tool is used to determine the location and height of a fracture in a formation and the porosity of the formation. The pre-fracture and post-fracture data sets generated from a compensated neutron tool includes count rates and count rate ratios.

An embodiment of the present invention uses a single detector thermal neutron tool to determine the location and height of a fracture. The pre-fracture and post-fracture data sets generated from a single detector thermal neutron tool include count rates.

According to certain embodiments of the present invention, the pre-fracture and post-fracture data sets are normalized prior to the step of comparing the pre-fracture and post-fracture data sets. Normalization involves adjusting the pre-fracture and post-fracture data for environmental and/or tool differences in order to compare the data sets.

According to certain embodiments of the present invention, the frac slurry includes a proppant containing the thermal neutron absorbing material. The proppant doped with the thermal neutron absorbing material has a thermal neutron capture cross-section exceeding that of elements normally encountered in subterranean zones to be fractured. According to certain embodiments of the present invention, the proppant containing the thermal neutron absorbing material has a macroscopic thermal neutron capture cross-section of at least about 90 capture units, and preferably up to 900 capture units or more. Preferably, the proppant material is a granular ceramic material, with substantially every grain of the proppant material having a high capture cross section thermal neutron absorbing material integrally incorporated therein.

According to yet another embodiment of the present invention, the thermal neutron absorbing material is boron, cadmium, gadolinium, iridium, or mixtures thereof.

Suitable boron containing high capture cross-section materials include boron carbide, boron nitride, boric acid, high boron concentrate glass, zinc borate, borax, and combinations thereof. A proppant containing 0.1% by weight of boron carbide has a macroscopic capture cross-section of approximately 92 capture units. A suitable proppant containing 0.025-0.030% by weight of gadolinium oxide has similar thermal neutron absorption properties as a proppant containing 0.1% by weight of boron carbide. Most of the examples set forth below use boron carbide; however those of ordinary skill in the art will recognize that any high capture cross section thermal neutron absorbing material, such as gadolinium oxide, can be used.

According to certain embodiments of the present invention, the proppant utilized includes about 0.025% to about 4.0% by weight of the thermal neutron absorbing material. According to certain embodiments of the present invention, the proppant includes a concentration of about 0.1% to about 4.0% by weight of a boron compound thermal neutron absorbing material. According to certain embodiments of the present invention, the proppant includes a concentration of about 0.025% to about 1.0% by weight of a gadolinium compound thermal neutron absorbing material.

According to embodiments of the present invention, the proppant may be a ceramic proppant, sand, resin coated sand, plastic beads, glass beads, and other ceramic or resin coated proppants. Such proppants may be manufactured according to any suitable process including, but not limited to continuous spray atomization, spray fluidization, spray drying, or compression. Suitable proppants and methods for manufacture are disclosed in U.S. Pat. Nos. 4,068,718, 4,427,068, 4,440,866, 5,188,175, and 7,036,591, the entire disclosures of which are incorporated herein by reference.

According to certain embodiments of the present invention, the thermal neutron absorbing material is added to the ceramic proppant during the manufacturing process such as continuous spray atomization, spray fluidization, spray drying, or compression. Ceramic proppants vary in properties such as apparent specific gravity by virtue of the starting raw material and the manufacturing process. The term "apparent specific gravity" as used herein is the weight per unit volume (grams per cubic centimeter) of the particles, including the internal porosity. Low density proppants generally have an apparent specific gravity of less than 3.0 g/cc and are typically made from kaolin clay and alumina. Intermediate density proppants generally have an apparent specific gravity of about 3.1 to 3.4 g/cc and are typically made from bauxitic clay. High strength proppants are generally made from bauxitic clays with alumina and have an apparent specific gravity above 3.4 g/cc. A thermal neutron absorbing material may be added in the manufacturing process of any one of these proppants to result in proppant suitable for use according to certain embodiments of the present invention. Ceramic proppant may be manufactured in a manner that creates porosity in the proppant grain. A process to manufacture a suitable porous ceramic is described in U.S. Pat. No. 7,036,591, the entire disclosure of which is incorporated by reference herein. In this case the thermal neutron absorbing material is impregnated into the pores of the proppant grains to a concentration of about 0.025 to about 4.0% by weight.

According to certain embodiments of the present invention, the thermal neutron absorbing material is incorporated into a resin material and ceramic proppant or natural sands are coated with the resin material containing the thermal neutron absorbing material. Processes for resin coating proppants and natural sands are well known to those of ordinary skill in the art. For example, a suitable solvent coating process is described in U.S. Pat. No. 3,929,191, to Graham et al., the entire disclosure of which is incorporated herein by reference. Another suitable process such as that described in U.S. Pat. No. 3,492,147 to Young et al., the entire disclosure of which is incorporated herein by reference, involves the coating of a particulate substrate with a liquid, uncatalyzed resin composition characterized by its ability to extract a catalyst or curing agent from a non-aqueous solution. Also a suitable hot melt coating procedure for utilizing phenol-formaldehyde novolac resins is described in U.S. Pat. No. 4,585,064, to Graham et al, the entire disclosure of which is incorporated herein by reference. Those of ordinary skill in the art will be familiar with still other suitable methods for resin coating proppants and natural sands.

Accordingly, the methods of the present invention may be implemented with ceramic proppant or natural sands coated with or otherwise containing the thermal neutron absorbing material. According to certain embodiments of the present invention, a suitable thermal neutron absorbing material is either boron carbide or gadolinium oxide, each of which has an effective thermal neutron absorbing capacity at a low concentration in tagged proppant or sand. The concentration of such thermal neutron absorbing materials is generally on the order of about 0.025% to about 4.0% by weight of the proppant. For boron compounds such as boron carbide, the concentration is about 0.1% to about 4.0% by weight of the proppant, and for gadolinium compounds such as gadolinium oxide, the concentration is about 0.025% to about 1.0% by weight of the proppant. These concentrations are low enough such that the other properties of the tagged proppant (such as crush strength) are essentially unaffected by the addition of the high capture cross section material. While any high capture cross-section thermal neutron absorbing material may be used in the embodiments of the present invention, in embodiments of the present invention which employ pulsed neutron tools, boron carbide or other boron containing materials may be used because thermal neutron capture by boron does not result in measurable gamma radiation in the detectors in the logging tool. Also, in embodiments of the present invention which employ neutron or compensated neutron tools, gadolinium oxide or other gadolinium containing materials may be used because a smaller amount of the gadolinium-containing tagging material is required relative to boron containing materials. The weight percentage required to produce similar thermal neutron absorption properties for other high thermal neutron capture cross section materials will be a function of the density and molecular weight of the material used, and on the capture cross sections of the constituents of the material.

A manufactured ceramic proppant containing about 0.025% to about 4.0% by weight of a thermal neutron absorbing material can be cost effectively produced, and can provide useful fracture identifying signals when comparing neutron, compensated neutron, or PNC log responses run before and after a frac job. These signals are capable of indicating and distinguishing between the intervals that have and those that have not been fractured and propped.

As shown in FIG. 1, a well site fracturing operation involves blending water with a gel to create a viscous fracturing fluid. The proppant including a thermal neutron absorbing material is added to the viscous fracturing fluid creating a slurry, which is pumped down the well with high pressure pumps. The high-pressure slurry is forced into the fractures induced in the formation, and possibly also into the borehole region adjacent to the fractures. The proppant particles are pumped downhole in a liquid (frac slurry) and into the induced fractures, and also possibly into the borehole region adjacent to the zones where the fractures have penetrated into the surrounding formations.

Figure 2:
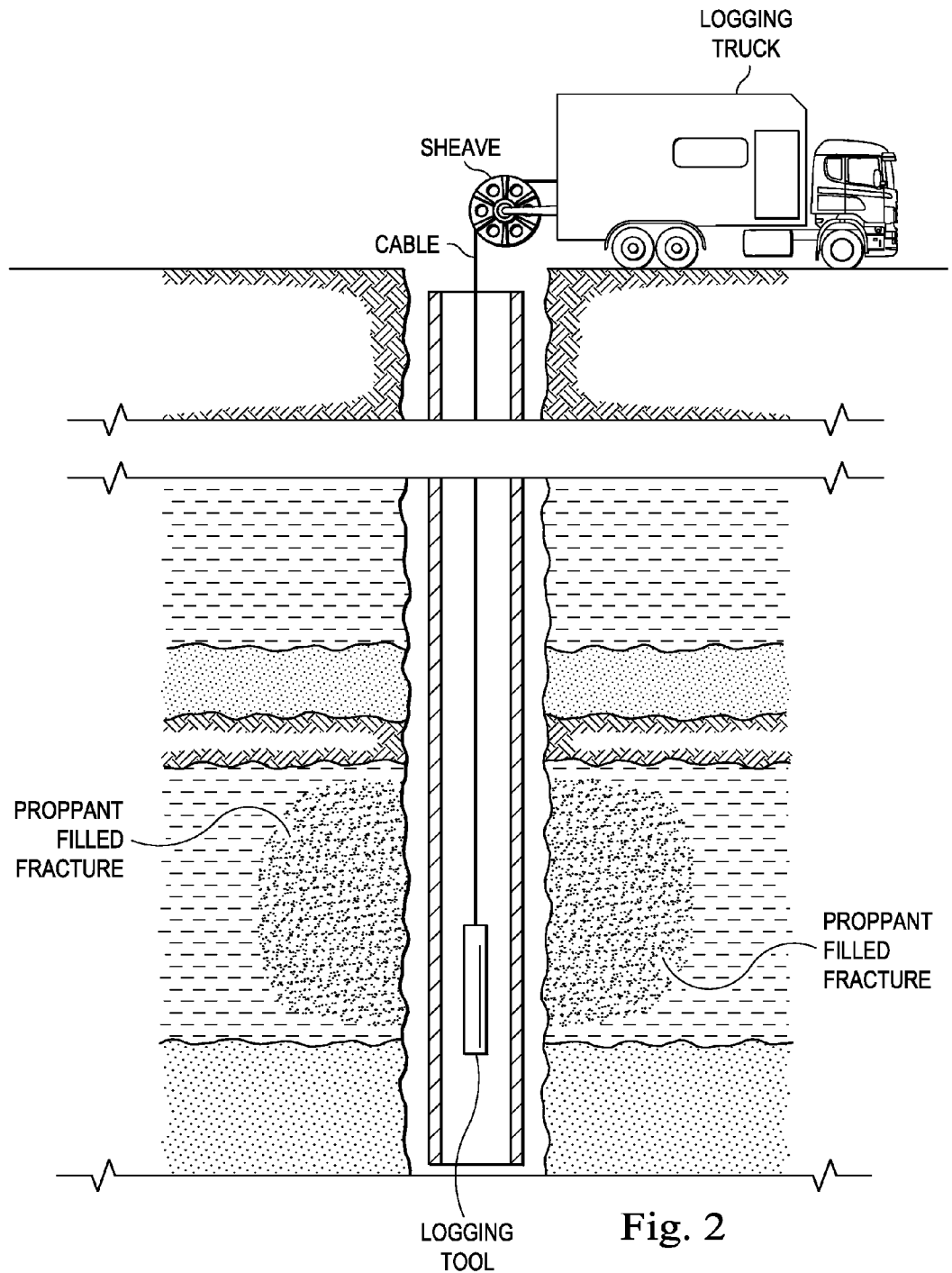
FIG. 2 is a schematic view showing logging of a downhole formation containing induced fractures.

FIG. 2 depicts a logging truck at the well site with a neutron, compensated neutron, or PNC logging tool at the depth of the induced fracture. Power from the logging truck (or skid) is transmitted to the logging tool, which records and transmits logging data as the tool is logged past the fracture zone(s) and the formations above and/or below the zone(s) being fractured.

According to embodiments of the present invention, the induced hydraulic fracture identification process using a proppant having a thermal neutron absorbing material and measurements from a neutron (including compensated neutron) or pulsed neutron capture (PNC) logging tools includes:

1. Preparing proppant doped with a thermal neutron absorbing material by fabricating the proppant from starting materials that include a thermal neutron absorbing material, by coating the thermal neutron absorbing material onto the proppant or by impregnating or otherwise incorporating the thermal neutron absorbing material into the proppant.

2. Running and recording, or otherwise obtaining, a pre-fracture thermal neutron or compensated neutron log (including single or multiple detector tools), or a PNC log across the potential zones to be fractured to obtain a pre-fracture data set, and preferably also including zones outside the potential fracture zones.

3. Conducting a hydraulic fracturing operation in the well, incorporating the proppant having a thermal neutron absorbing material into the frac slurry pumped downhole.

4. Running and recording a post-fracture neutron, compensated neutron, or PNC log (utilizing the same log type as used in the pre-fracture log) across the potential zones of fracture including one or more fracture intervals to obtain a post-fracture data set, and preferably also including zones outside the interval where fracturing was anticipated. The logs may be run with the tool centered or eccentered within the casing or tubing. The pre-fracture and post-fracture logs are preferably run in the same condition of eccentricity.

5. Comparing the pre-fracture and post-fracture data sets from the pre-fracture and post-fracture logs (after any log normalization), to determine location of proppant. Normalization may be necessary if the pre-fracture and post-fracture logs were run with different borehole conditions, or if different tools or sources were used. This may be especially true if the pre-fracture log was recorded at an earlier time in the life history of the well, using wireline, memory, and/or logging-while-drilling (LWD) sensors. Normalization procedures compare the log data from zones preferably outside of the possibly fractured intervals in the pre-fracture and post-fracture logs. Since these zones have not changed between the logs, the gains and/or offsets are applied to the logs to bring about agreement between the pre-fracture and post-fracture logs in these normalization intervals. The same gains/offsets are then applied to the logs over the entire logged interval. Differences in the data indicate the presence of proppant in the fracture and/or the borehole region adjacent to a fracture.

For neutron and compensated neutron tools, the observed count rate decreases in the post-fracture log relative to the pre-fracture log indicates the presence of proppant containing a strong thermal neutron absorbing material. Small changes in count rate ratios may also be indicative of the presence of proppant.

For PNC tools, increases in computed formation and/or borehole capture cross-sections, and decreases in the computed borehole and/or formation component count rates in selected time intervals between the neutron bursts (especially if boron is used as the high capture cross section material), in the post-fracture log relative to the pre-fracture log indicate the presence of proppant containing a thermal neutron absorbing material.

6. Detecting the location and height of the fracture by correlating the differences in data from step (5) to a depth measurement of the borehole. These differences can be measured using well logs, as shown in the exemplary well logs in FIGS. 7A-7B.

Further embodiments of the present invention include changes in the methods described herein such as, but not limited to, incorporating multiple pre-fracture logs into any pre-fracture versus post-fracture comparisons, or the use of a simulated log for the pre-fracture log (such simulated logs being obtained for instance using neural networks to generate simulated neutron, compensated neutron, or PNC log responses from other open or cased hole logs on the well), or the use of multiple stationary logging measurements instead of, or in addition to, data collected with continuous logs.

In additional embodiments of the invention, first and second post-fracture data sets are obtained and utilized to determine the differences, if any, between the quantities of proppant in the fracture zones before producing a quantity of well fluids from the subterranean formation and the quantities of proppant in the fracture zones after such production by comparing the post-fracture data sets. The determined proppant quantity differences are utilized to determine one or more production and/or fracture-related characteristics of the subterranean formation such as: (a) one or more of the fracture zones is not as well propped as it was initially, (b) production from one or more of the fracture zones is greater than the production from the other zones, and (c) one or more of the fracture zones is not producing. This post-fracturing procedure may be carried out using a compensated neutron logging tool or a pulsed neutron capture logging tool, possibly augmented with other wellsite information or information provided by other conventional logging tools, such as production logging tools.

In yet another preferred embodiment, the apparent formation hydrogen index in downhole formations is computed using a predetermined relationship between the formation hydrogen index and the ratio of count rates between two thermal neutron or capture gamma ray detectors in a compensated neutron or pulsed neutron logging tool. This apparent hydrogen index is then compared to a second estimate of the apparent formation hydrogen index computed using a predetermined relationship between the formation hydrogen index and the count rate observed in one of the detectors in the corresponding logging tool. If these functional relationships are developed assuming the borehole conditions encountered downhole (or reflect corrections for variations in borehole conditions), the differences between the apparent hydrogen index computed from the ratio versus the hydrogen index computed from the count rate will be indicative of high thermal neutron cross section material tagged proppant in the fracture and/or the borehole annulus. This embodiment enables the presence of proppant to be determined when the hydrogen index (e.g. gas saturation in the pore space) changes between the pre-frac and post-frac logs. It also enables the determination of the presence of tagged proppant without the requirement for a pre-frac log, if borehole conditions at the time of the post-frac log are sufficiently well known.

Techniques are also presented to correct the computed apparent hydrogen index values if the borehole conditions are different in the well from those assumed in the predetermined relationship to derive apparent hydrogen index from the detector count rate. In that event, the hydrogen index computed from the count rate in the pre-frac log will not agree with that determined from the ratio in the pre-frac log, since the ratio measurement is much less sensitive to changes in borehole conditions than an individual detector count rate. If that disagreement in computed hydrogen index is observed, then the predetermined relationship for converting count rate to hydrogen index is adjusted until the apparent hydrogen index computed from the count rate matches that computed from the ratio. And since borehole conditions in most cases will not change significantly between the pre-frac and post-frac logs, then that adjusted predetermined relationship is also applied to compute apparent hydrogen index from the count rate in the post-frac log. If borehole conditions do change, however, between the pre-frac log and post-frac log, as indicated by disagreement between the hydrogen index values computed from the post-frac ratio and the post-frac count rate in logged intervals outside the interval(s) of potential fracturing, then the procedure described immediately below for situations when no pre-frac log is available should be used to locate tagged proppant.

In situations where no pre-frac log is available, or in situations when borehole conditions change between the pre-frac and post-frac logs, then essentially the same procedure can be applied using only the post-frac log. In that situation, the hydrogen index computed from the ratio is compared with that computed from the count rate, but only selecting intervals for the comparison outside of the interval(s) of possible fracturing. If there is disagreement between the two computed hydrogen indices in these selected intervals, then the predetermined relationship used to compute apparent hydrogen index from the count rate is adjusted until the two computed hydrogen indices agree in these selected intervals. That adjusted count rate to hydrogen index relationship is then applied throughout the entire logged interval in the well.

Another preferred embodiment for using near/far (N/F) ratio and detector count rate to locate tagged proppant is via a crossplot of N/F ratio vs. detector count rate. Both ratio and detector count rate are strongly related to formation hydrogen index (HI), therefore a crossplot of these two variables (with no tagged proppant present) will plot as a well defined trend or trendline, with movement along the trendline representing formations with different HI values. As described hereinbefore, thermal neutron detector count rate is also significantly affected by changes in tagged proppant in an induced fracture and/or in the borehole region adjacent to a fractured zone. The N/F ratio, however, is much less sensitive to the presence of tagged proppant. Therefore points on the ratio-count rate crossplot corresponding to zones containing tagged proppant will fall off of this proppant-free trend/trendline. Since each of the points on the crossplot can be identified by the depth in the well corresponding to that point on the crossplot (via the logging software), the location of each depth interval (zone) in the well containing proppant can be identified by the divergence of those points from the trend/trendline. Further, the amount of divergence from the trend/trendline (analogous to the amount of separation between ratio-based and count rate based hydrogen indices in proppant containing zones in the method described above) is correlated to the concentration of absorber in the proppant, the width of the fracture, and/or the radial distribution of the proppant present.

According to certain embodiments of the thermal neutron logging method, fast neutrons are emitted from a neutron source into the wellbore and formation, and are rapidly thermalized to thermal neutrons by elastic and inelastic collisions with formation and borehole region nuclei. Elastic collisions with hydrogen in the formation and the borehole region are a principal thermalization mechanism. The thermal neutrons diffuse in the borehole region and the formation, and are eventually absorbed by one of the nuclei present. Generally these absorption reactions result in the almost simultaneous emission of capture gamma rays; however, absorption by boron is a notable exception. The detectors in the logging tool either directly detect the thermal neutrons that are scattered back into the tool (in most neutron and compensated neutron tools, and also in some versions of PNC tools), or indirectly by detecting the gamma rays resulting from the thermal neutron absorption reactions (in some versions of neutron and compensated neutron tools, and in most commercial versions of PNC tools). Most compensated neutron and PNC tools are configured with a neutron source and dual detectors arranged above the neutron source which are referred to herein as a "near" detector and a "far" detector. According to embodiments of the present invention, compensated neutron and pulsed neutron capture tools may be used that include one or more detectors. For example, suitable compensated neutron and PNC tools incorporate a neutron source and three detectors arranged above the neutron source, which are referred to herein as the near, far, and "extra-far" or "xfar" detectors such that the near detector is closest to the neutron source and the xfar detector is the farthest away from the neutron source. It is also possible that one or more of the neutron detectors may be located below the neutron source.

A compensated neutron tool also computes the ratio of near-to-far detector count rates. The porosity (hydrogen index) of the formation can be determined from these count rates and the near-to-far detector count rate ratios.

A pulsed neutron capture tool logging system measures the decay rate (as a function of time between the neutron pulses) of the thermal neutron or capture gamma ray population in the formation and the borehole region. From this decay rate curve, the capture cross-sections of the formation $\Sigma_{fm}$ (sigma-fm) and borehole $\Sigma_{bh}$ (sigma-bh), and the formation and borehole decay components can be resolved and determined. The higher the total capture cross-sections of the materials in the formation and/or in the borehole region, the greater the tendency for that material to capture thermal neutrons. Therefore, in a formation having a high total capture cross-section, the thermal neutrons disappear more rapidly than in a formation having a low capture cross-section. This appears as a steeper slope in a plot of the observed count rate versus time.

Figure 7A:
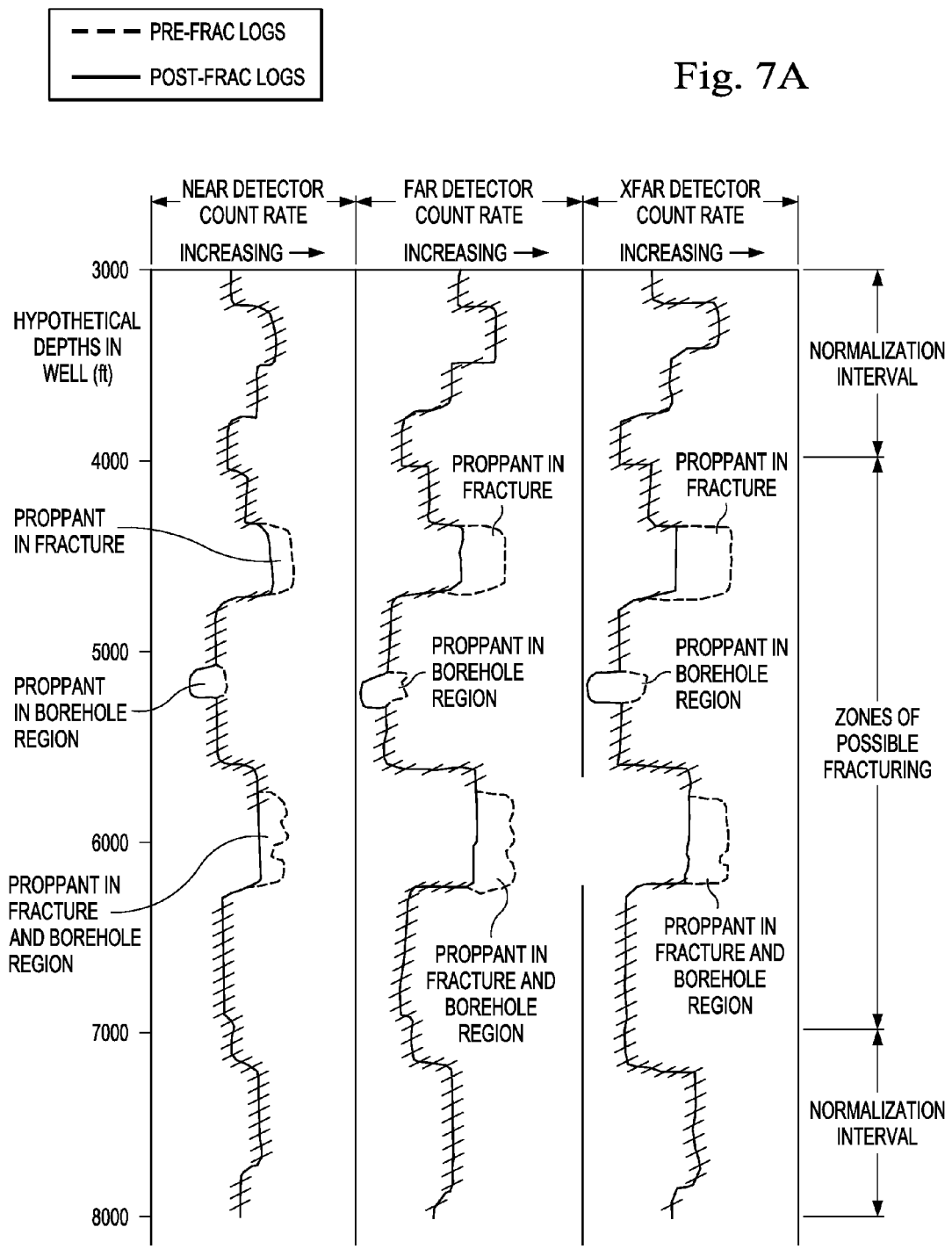
FIGS. 7A-7B are exemplary well logs for identification of proppant in the formation and the borehole region.
Figure 7B:
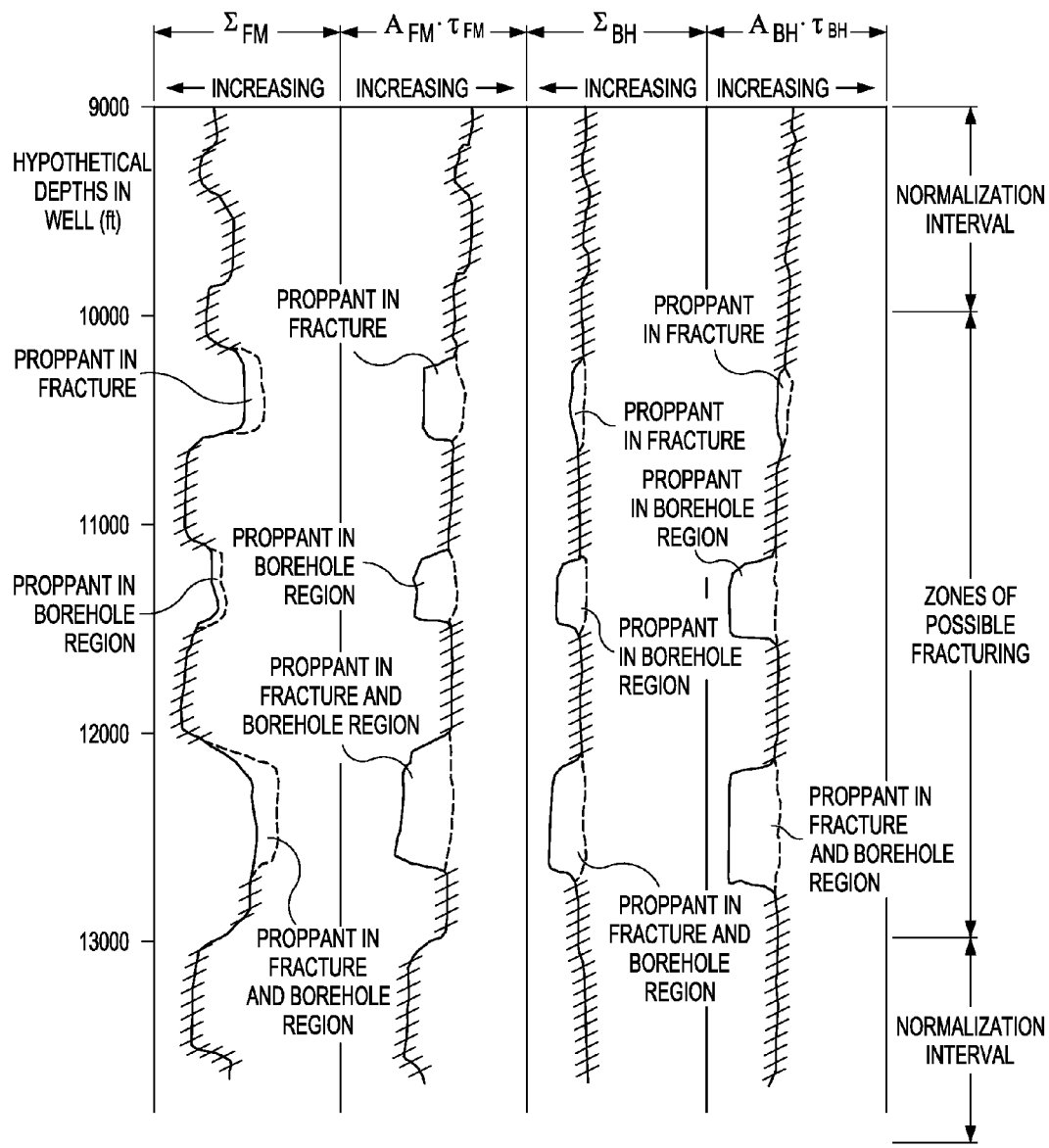

The differences between the PNC borehole and formation pre-fracture and post-fracture parameters can be used to distinguish proppant in the formation from proppant in the wellbore, as shown in the exemplary FIG. 7B.

The data used to generate FIGS. 4A to 5B and Tables 1-4 was modeled using neutron or compensated neutron tools employing thermal neutron detectors, such as $He^3$ detectors. It will be understood that it would also be possible to employ corresponding processing for these tools using gamma ray sensing detectors, or detectors which sense both neutrons and gamma rays. The PNC data used to generate FIGS. 6A to 6C was modeled using tools employing gamma ray detectors. A capture gamma ray detector measures gamma rays emitted after thermal neutrons are captured by elements in the vicinity of the thermal neutron "cloud" in the wellbore and formation. However, the capture of a thermal neutron by boron does not result in a gamma ray being emitted. Therefore, if proppant doped with boron is present, the count rate decreases observed in compensated neutron or PNC tools employing gamma ray detectors will be accentuated relative to tools with thermal neutron detectors. This is because not only will the gamma ray count rate decreases due to increased neutron absorption be observed, but also additional decreases due to the fact that only the non-boron neutron captures would result in detectable gamma ray events.

The following examples are presented to further illustrate various aspects of the present invention, and are not intended to limit the scope of the invention. The examples set forth below, with the exception of the exemplary well logs shown in FIGS. 7A-7B, were generated using the Monte Carlo N-Particle Transport Code version 5 (hereinafter "MCNP5"). The MCNP5 is a software package that was developed by Los Alamos National Laboratory and is commercially available within the United States from the Radiation Safety Information Computation Center. The MCNP5 software can handle geometrical details and accommodates variations in the chemical composition and size of all modeled components, including borehole fluid salinity, the concentration of the thermal neutron absorbing material in the proppant in the fracture, and the width of the fracture. The MCNP5 data set forth below resulted in statistical standard deviations of approximately 0.5-1.0% in the computed count rates.

In most of the following examples, the proppant was doped with boron carbide; however other suitable thermal neutron absorbing materials, such as gadolinium oxide, may be used.

Preferably, the proppant is a granular ceramic material into substantially every grain of which the dopant is integrally incorporated.

Figure 3A:
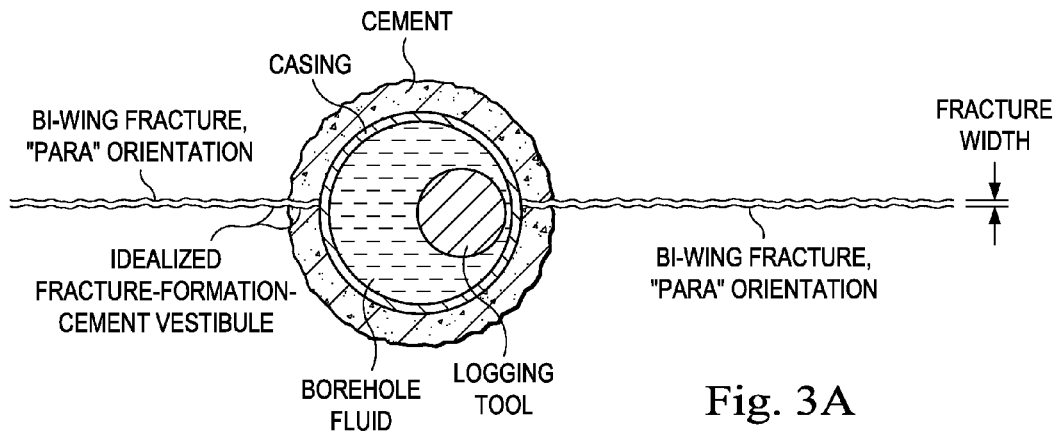
FIGS. 3A and 3B are plan views from the orientation of the Z-axis with respect to "para" and "perp" tool placement geometries relative to the fracture.
Figure 3B:
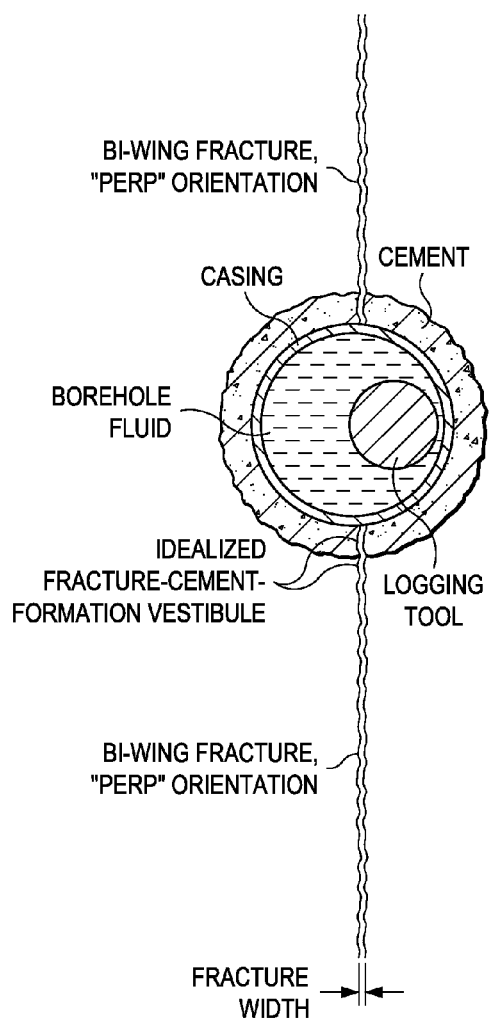
Figure 4A:
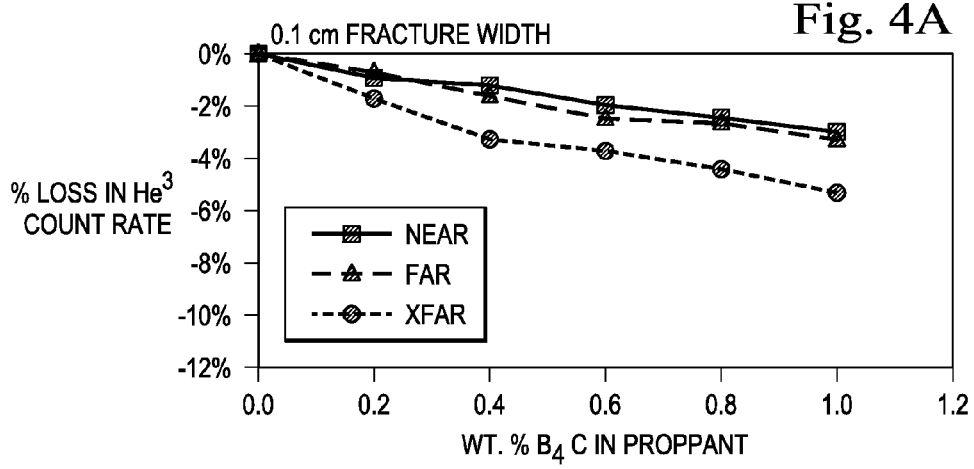
FIGS. 4A-4F are graphs of three detectors modeled at different locations (near, far, xfar) on a compensated neutron tool showing neutron count rate sensitivity as a function of fracture width and boron carbide ($B_4C$) concentration in proppant.
Figure 4B:
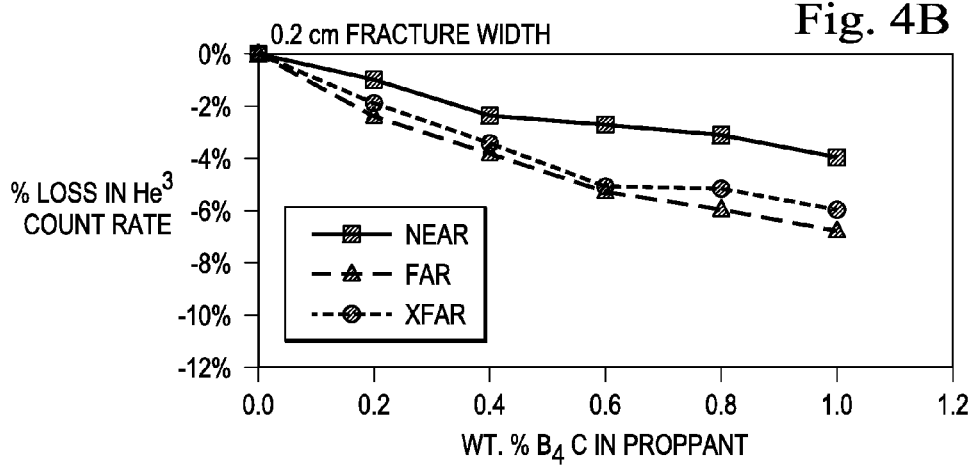
Figure 4C:
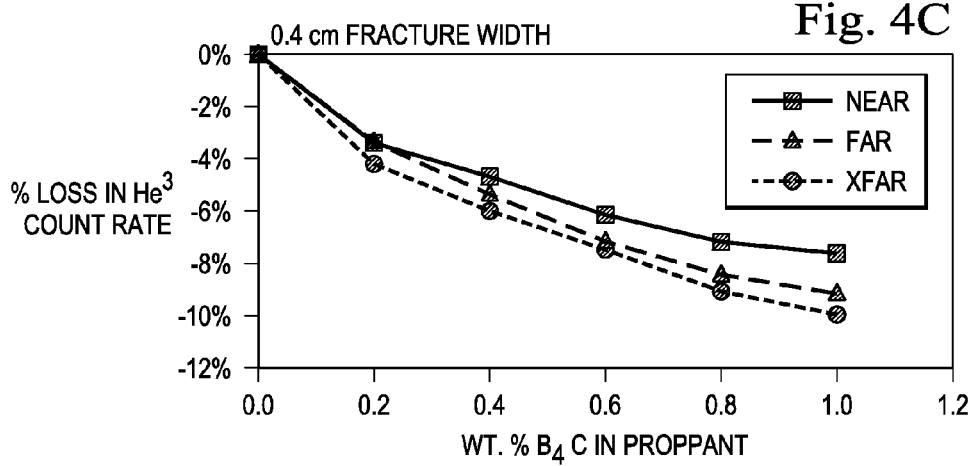
Figure 4D:
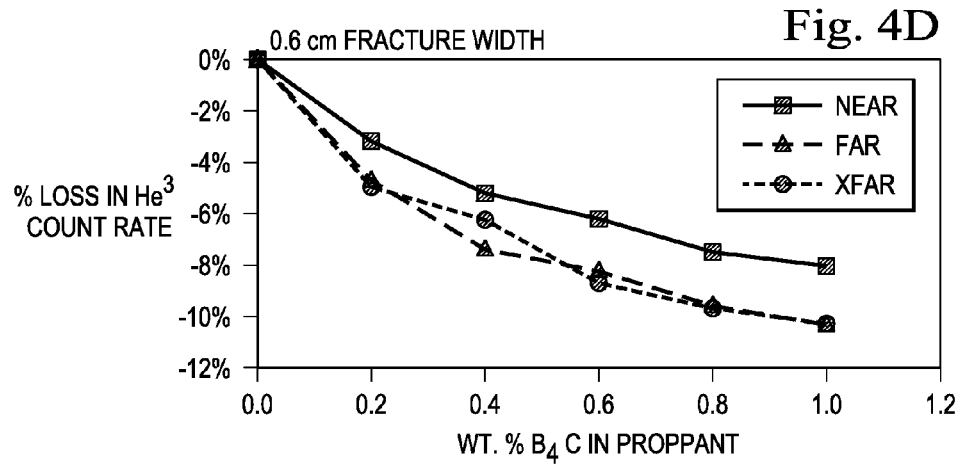
Figure 4E:
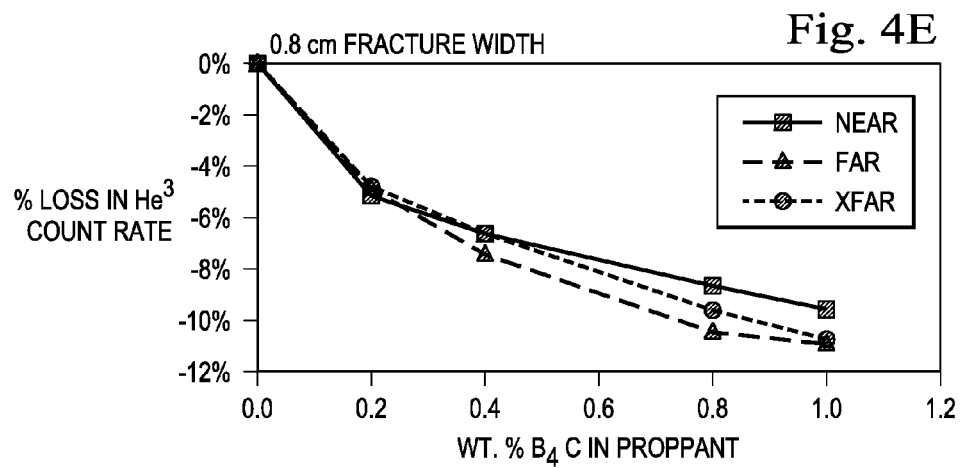
Figure 4F:
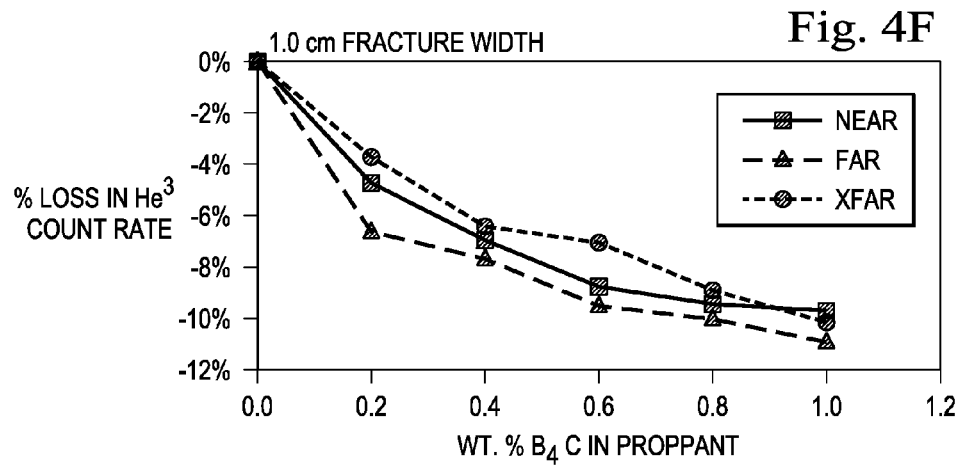
Figure 4G:
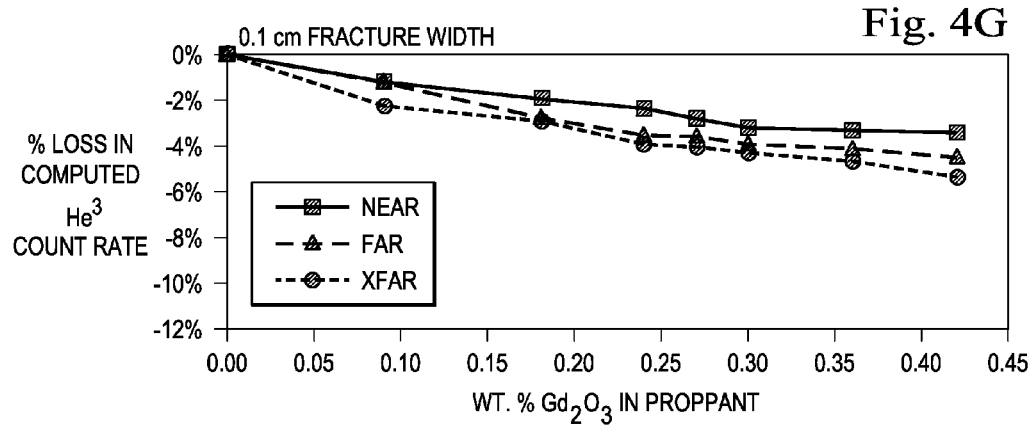
FIGS. 4G-4L are similar to FIGS. 4A-4F, with gadolinium oxide ($Gd_2O_3$) replacing $B_4C$ as the high capture cross section material in the proppant.
Figure 4H:
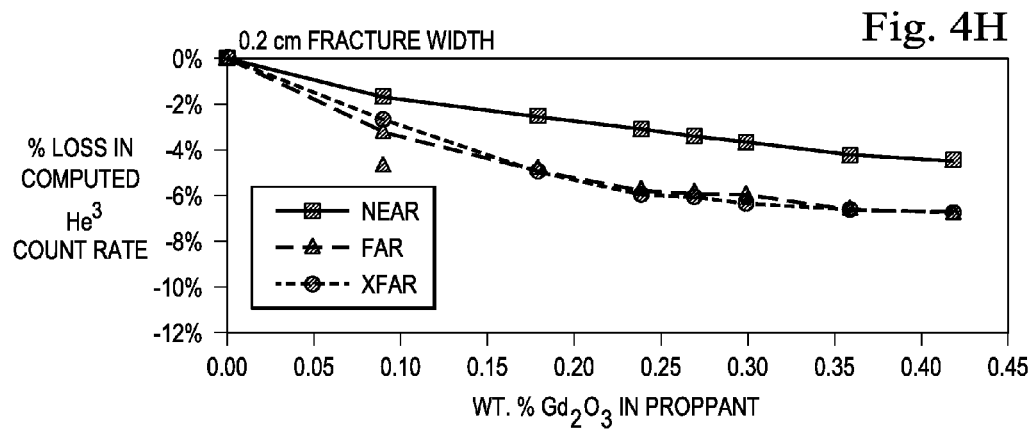
Figure 4I:
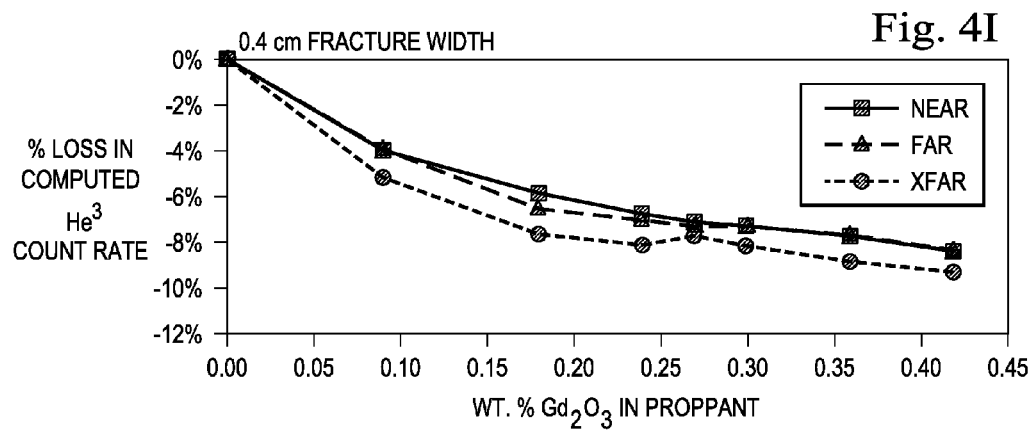
Figure 4J:
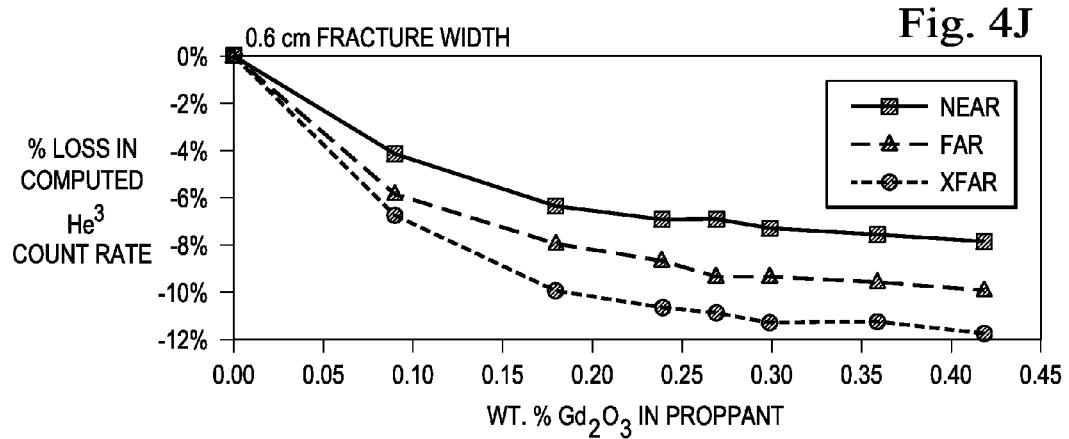
Figure 4K:
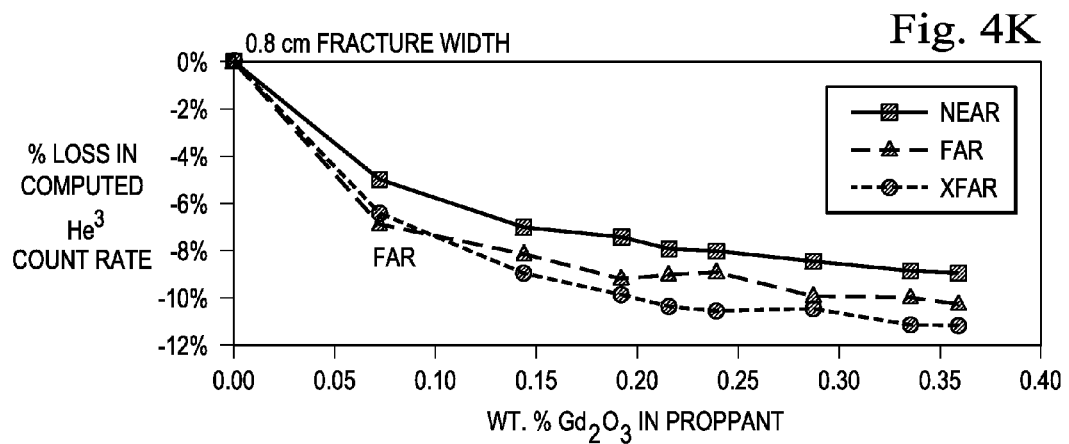
Figure 4L:
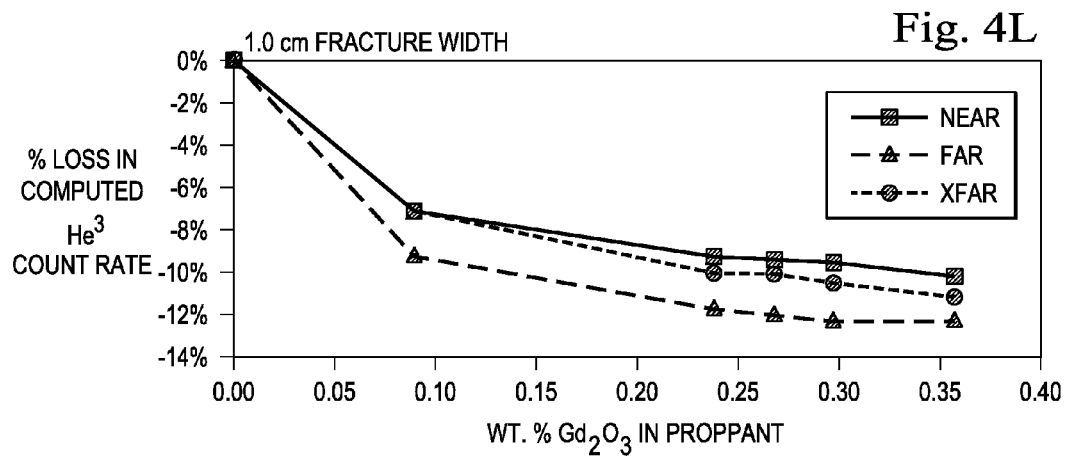

For the purposes of the following examples, FIGS. 3A and 3B present views along the Z-axis of the geometries used in the MCNP5 modeling. In all cases the 8 inch diameter borehole is cased with a 5.5 inch O.D. 24 lb/ft. steel casing and no tubing, and is surrounded by a 1 inch wide cement annulus. The 1.6875 inch diameter tool is shown in the parallel ("para") position in FIG. 3A and in the perpendicular ("perp") position in FIG. 3B. In the "para" position the decentralized logging tool is aligned with the fracture, and in the "perp" position it is positioned 90° around the borehole from the fracture.

In FIGS. 3A and 3B, the formation area outside the cement annulus was modeled as a sandstone with a matrix capture cross-section of 10 capture units (cu). Data was collected for water-saturated formations with several porosities. These two figures show the idealized modeling of the formation and borehole region that was used in most MCNP5 runs. The bi-wing vertical fracture extends radially away from the wellbore casing, and the frac slurry in the fracture channel replaces the cement in the channel as well as the formation in the channel outside the cement annulus. The width of the fracture channel was varied between 0.1 cm and 1.0 cm in the various modeling runs. In one study, the entire cement annulus was replaced by proppant doped with boron carbide. The MCNP5 model does not provide output data in the form of continuous logs, but rather data that permit, in given formations and at fixed positions in the wellbore, comparisons of pre-fracture and post-fracture logging responses.

EXAMPLE 1

Neutron/Compensated Neutron Tool

The MCNP5 software modeled a compensated neutron logging tool with a continuous neutron source and one or more thermal neutron detectors, and the resulting count rate(s) and count rate ratios were recorded for the geometries shown in FIG. 3A or 3B. These observed parameters were then compared to corresponding values recorded in MCNP5 runs made before a well was fractured. Decreases in observed count rates in the post-fracture data relative to the pre-fracture data in FIGS. 4A-4F for various fracture widths and boron carbide concentrations are indicative of the presence of the boron carbide doped proppant, and hence the presence of the induced fractures. In general, since similar percentage decreases in count rates are observed in each of the detectors for a given concentration of boron containing proppant present, the fractional changes in a count-rate ratio will be much less than the changes observed in the individual detector count rates themselves. In FIGS. 4G-4L, modeled with gadolinium oxide replacing boron carbide as the high capture cross section material in the proppant in the same formation and fracture width conditions as FIGS. 4A-4F, very similar decreases are observed in count rates in post-fracture data relative to pre-fracture data relative to those observed with boron carbide present. It is apparent from FIGS. 4A-4L that boron carbide and gadolinium oxide act similarly to reduce the detected count rates, however only about 25-30% of the weight percentage of gadolinium oxide relative to boron carbide in the proppant is required to produce similar count rate decreases.

The formation material and accompanying fractures were modeled to extend out to a radius of 100 cm from the center of the borehole, and vertically from 40 cm below the source to 100 cm above the source. The logging tool contained three $He^3$ thermal neutron detectors spaced away from an Americium-Beryllium (AmBe) neutron source. As shown in Table 1, formation porosity was modeled as 28.3%, 14.15%, 7.1%, and 3.5%.

TABLE 1

Compensated neutron tool data showing the sensitivity of the neutron tool count rates at different detector spacings to the presence of 1% boron carbide in a proppant relative to no frac present (cased and cemented borehole).

| Formation porosity (%) | Tool orientation: para or perp | $B_4C$ in proppant | Near Det. Count rate | % Change from Undoped Proppant | Far Det. Count Rate | % Change from Undoped Proppant | Xfar Det. Count Rate | % Change from Undoped Proppant |
|---|---|---|---|---|---|---|---|---|
| 28.3 | Para | 0% | 8390 | 0% | 772 | 0% | 62.2 | 0% |
| 28.3 | Para | 1% | 7563 | −9.9% | 678 | −12.2% | 54.1 | −13.0% |
| 28.3 | Perp | 0% | 8258 | 0% | 760 | 0% | 60.7 | 0% |
| 28.3 | Perp | 1% | 7974 | −3.4% | 727 | −4.3% | 58.4 | −3.8% |
| 14.15 | Para | 0% | 11632 | 0% | 1511 | 0% | 159.2 | 0% |
| 14.15 | Para | 1% | 10449 | −10.2% | 1300 | −14.0% | 134.1 | −15.8% |
| 7.1 | Para | 0% | 14946 | 0% | 2638 | 0% | 346.1 | 0% |
| 7.1 | Para | 1% | 13491 | −9.7% | 2256 | −14.5% | 286 | −17.4% |
| 3.5 | Para | 0% | 17792 | 0% | 3970 | 0% | 614.8 | 0% |
| 3.5 | Para | 1% | 16441 | −7.6% | 3418 | −13.9% | 513 | −16.6% |

Table 1 shows modeled thermal neutron count rates in a typical downhole formation geometry for three different source to detector spacings. The percentage change from undoped proppant shown in Table 1, is the percentage count rate reduction from the count rate when boron carbide doped proppant is in the fractures (C1%), relative to the count rate with no $B_4C$ present (C0%) and is calculated as (C1%−C0%)/C0%. The modeling data assumes the use of the 1.6875 inch diameter through-tubing neutron tool, and formation and borehole geometry described in FIGS. 3A and 3B. The formation being fractured has a low capture cross-section typical of candidate frac zones. The borehole casing and cement conditions are also typical (5.5 inch casing filled with non-saline fluid, and a 1 inch thick cement annulus surrounding the casing). The width of the fracture is 1.0 cm. The ceramic proppant in the fracture was modeled to be CARBO ECONOPROP®, which is a low density proppant having an apparent specific gravity of 2.7 and which is commercially available from CARBO Ceramics Inc. having 1.0% (w/w) boron carbide, but is otherwise typical. The formation porosity is assumed to be 28.3%, 14.15%, 7.1%, and 3.5%. In the case of the 28.3% porosity formation, the hydrogen index of the frac fluid plus proppant is the same as that of the formation without a fracture present. As a result, the effect of the boron carbide doped proppant on the count rates can be seen directly, without any influence of a change in hydrogen index of the frac slurry. The boron carbide doped proppant was assumed to be located only in the fracture itself. The computed decrease in count rate when the decentralized tool is aligned with the fracture plane ("para" geometry in FIG. 3A) varies somewhat with source-detector spacing, but in all cases is significant (an approximately 10-13% reduction relative to the situation when no fracture is present). With a larger diameter tool that displaces more of the borehole fluid, the signal would be even larger. Similar results would be obtained if gadolinium oxide is used as the high capture cross section material instead of boron carbide.

Additional data in Table 1 illustrates the effect of similar fracturing in lower (14.15%, 7.1%, and 3.5%) porosity formations, i.e., formations with lower hydrogen content (hydrogen index). In corresponding comparisons when the lower porosity formations were modeled instead of a 28.3% porosity formation, somewhat larger signals were generally observed relative to those in the 28.3% porosity formation. The increased signals in the lower porosity formations are due to the additional neutron attenuating effect produced by the higher hydrogen concentration in the frac fluid relative to that in the low porosity formations. These signals would be even more pronounced if the formation had been modeled to contain gas as well as, or instead of, water (or oil).

Also seen in Table 1 is a smaller, yet still significant, decrease in the observed count rates, when the tool is displaced 90° around the borehole ("perp" geometry in FIG. 3B), in which case the distance of the tool from the fracture is maximized. This reduction in signal due to misalignment of the tool and the fracture would be minimized if a larger diameter tool were used, or if some of the proppant were distributed within the borehole region as well as in the fracture. The count rates in Table 1 resulted in statistical standard deviations of approximately 0.5-1.0% in the computed count rates. This statistical repeatability can be observed in this figure, since in the 28.3% porosity formation, the "para" and "perp" runs with no boron carbide present are effectively repeat runs.

Data was also collected using the same 28.3% porosity formation, borehole, and tool parameters as in Table 1, but with varied fracture widths and differing boron carbide concentrations in the proppant, as shown in FIGS. 4A through 4F. The count rate decreases (signals) are enhanced as the boron carbide concentration in the proppant increases. Also the data indicates that even for fractures as thin as 0.1 to 0.2 cm, a significant signal is observed when the boron carbide concentration in the proppant approaches 1.0%. The data also indicates that the signals at the different source-detector spacings were not greatly different, implying that a short spacing detector, with the resulting higher count rates (and hence smaller statistical errors), would be usable. Also indicated by the very similar responses for fractures wider than 0.5 cm, is that concentrations of boron carbide in the proppant higher than 1.0% would be of only limited utility. However, if it is anticipated that fracture widths in certain types of formations would tend to be very narrow, the boron carbide concentration in the proppant can be increased to the range of about 1.0% to about 4.0%. There is a measurable count rate reduction in the presence of borated proppant for boron carbide concentrations shown in FIGS. 4A-4F, even as low as about 0.1% boron carbide. FIGS. 4G-4L illustrate exactly the same formation, borehole and fracture conditions as illustrated in FIGS. 4A-4F, however gadolinium oxide was used as the high cross section material instead of boron carbide. As can be seen, only 25-30% as much gadolinium oxide relative to boron carbide is required to produce similar decreases in count rates.

Figure 5A:
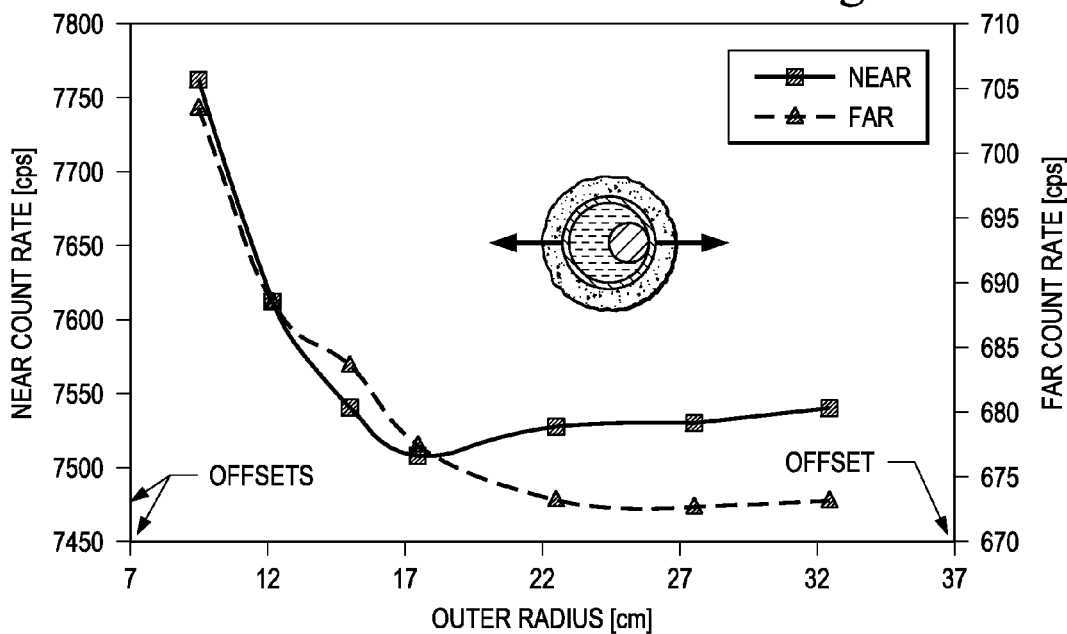
FIGS. 5A and 5B are graphs evaluating the depth of measurement using two detectors at different locations (near and far) on a compensated neutron tool.
Figure 5B:
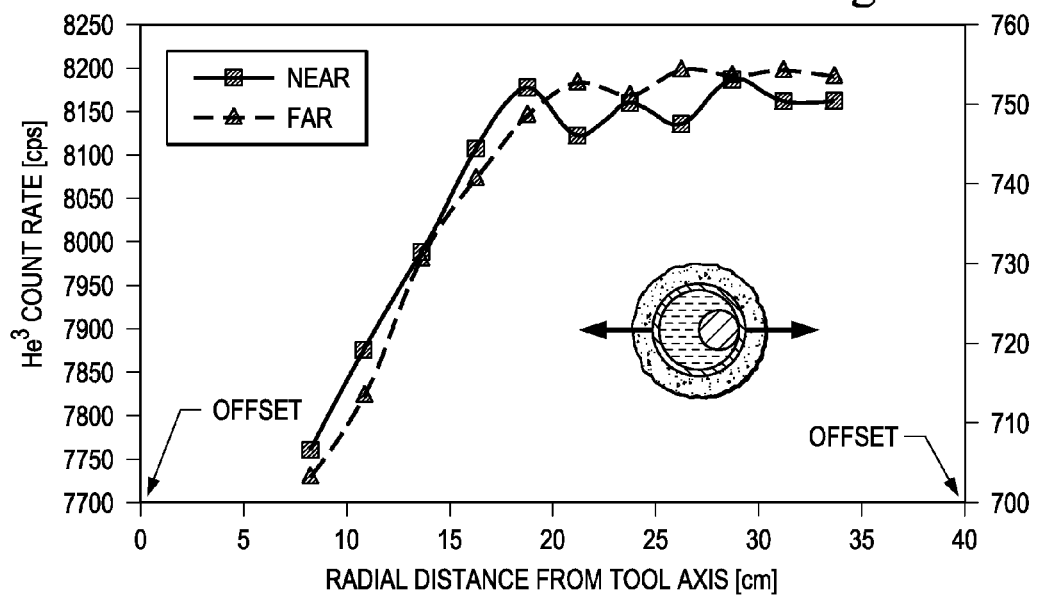

Referring to FIGS. 5A and 5B, data was collected to determine the depth of the investigation of the measurement, in other words, how far back into the formation from the casing could boron carbide doped proppant with 1.0% boron carbide be detected in a 1.0 cm wide fracture. In FIG. 5A, data is modeled for the fracture extending outward from the borehole to progressively deeper depths into the formation. Good fracture sensitivities in the count rates were observed out to about 10 cm from the casing, i.e. 7.5 cm out past the cement annulus. FIG. 5B integrates the contribution from a small incremental volume of fracture material, as this volume element is modeled progressively further from the casing. From the data in both of these figures, it can be seen that the sensitivity of the detected count rates to any proppant greater than 10 cm radially from the casing is greatly reduced.

Since frac material in the borehole region is usually also indicative of a propped fracture adjacent to that interval of the borehole, an annulus in the borehole of propped frac slurry outside the casing (proppant slurry replacing the cement) was modeled. Results with the 1.0% boron carbide proppant in the annulus alone, as well as with the proppant in both the annulus and a 1.0 cm wide fracture in a 28.3% porosity formation, are illustrated in Table 2A. Table 2A also indicates the effect of fractures in the "perp" orientation rather than the "para" orientation relative to the logging tool. Table 2B presents similar data for $Gd_2O_3$ proppant in the annulus alone as well as with proppant in both the annulus and in a 0.4 cm wide fracture. Several different concentrations of $Gd_2O_3$ (0.0%, 0.054%, 0.27%, and 0.45%) are illustrated for the proppant in the annulus. The 0.0% data represents standard (undoped) ceramic proppant. The 0.27% data represents a $Gd_2O_3$ concentration roughly equivalent in effect to the 1% $B_4C$ doped proppant in Table 2A. The 0.054% data in Table 2B illustrates the annulus containing the $Gd_2O_3$ proppant at a reduced concentration (simulating 20% of the untagged proppant in the annulus being replaced by proppant containing 0.27% $Gd_2O_3$). The data with 0.45% $Gd_2O_3$ indicates the effect of further increasing the concentration of $Gd_2O_3$ in the proppant.

TABLE 2A

Neutron count rate sensitivity to borated proppant in the borehole annular (cement) region as well as in a fractured formation.
Formation with Fracture and/or Annulus Containing 1% $B_4C$ Proppant

| Formation | Annular region | Fracture | Near Count Rate | % Change from Undoped Proppant | Far Count Rate | % Change from Undoped Proppant | Xfar Count Rate | % Change from Undoped Proppant |
|---|---|---|---|---|---|---|---|---|
| ø = 28.3% with 1.0 cm wide fracture - para orientation | Proppant - undoped | Proppant - undoped | 8984.5 | 0 | 845.05 | 0 | 68.507 | 0 |

TABLE 2A-continued

Neutron count rate sensitivity to borated proppant in the borehole annular (cement) region as well as in a fractured formation.
Formation with Fracture and/or Annulus Containing 1% B$_4$C Proppant

| Formation | Annular region | Fracture | Near Count Rate | % Change from Undoped Proppant | Far Count Rate | % Change from Undoped Proppant | Xfar Count Rate | % Change from Undoped Proppant |
|---|---|---|---|---|---|---|---|---|
| ø = 28.3% with 1.0 cm wide fracture - para orientation | Proppant + 1% B$_4$C | Proppant - undoped | 6184.8 | −31.2% | 553.96 | −34.4% | 44.862 | −34.5% |
| ø = 28.3% with 1.0 cm wide fracture - para orientation | Proppant + 1% B$_4$C | Proppant + 1% B$_4$C | 6135.6 | −31.7% | 547.95 | −35.2% | 44.474 | −35.1% |
| ø = 28.3% with 1.0 cm wide fracture - perp orientation | Proppant - undoped | Proppant - undoped | 8984.5 | 0 | 845.05 | 0 | 68.507 | 0 |
| ø = 28.3% with 1.0 cm wide fracture - perp orientation | Proppant + 1% B$_4$C | Proppant - undoped | 6172.5 | −31.3% | 554.25 | −34.4% | 44.89 | −34.5% |
| ø = 28.3% with 1.0 cm wide fracture - perp orientation | Proppant + 1% B$_4$C | Proppant + 1% B$_4$C | 6154.5 | −31.5% | 549.42 | −35.0% | 44.769 | −34.7% |
| ø = 28.3% with 1.0 cm wide fracture - para orientation | Plain Cement | Proppant- undoped | 8398.7 | | 772.1 | | 62.16 | |

As shown in Table 2A, the count rate decreases (signals) are now much larger (approximately 30-35% reduction in count rate) due to the 1% B$_4$C proppant in the annulus relative to undoped proppant in the annulus. However, when 1% B$_4$C doped proppant is present in the annular region, the effect of additional proppant in the fracture itself is essentially masked. This can be seen from the Table 2A data in that, with doped proppant in the annulus, there are only very small differences in the observed count rates whether or not doped proppant was also present in the fracture. This is true regardless of the orientation—"para" or "perp"—of the fracture relative to the logging tool. It can also be seen in Table 2A that undoped proppant in the annulus results in a somewhat (~5%) higher count rates than plain cement in the annulus, due to the lower hydrogen index of the modeled proppant slurry relative to cement. In any event, since the proppant in the borehole region is usually also indicative of the presence of formation fracturing adjacent to that interval of the borehole, the fracture signal is easily observable, and can be larger than the signal caused by proppant in the fracture alone. Of course it would be unlikely for the entire borehole annulus to be filled with proppant, but modeling data with only 0.2% B$_4$C in the annulus, representing a 20% proppant fill of the annulus, similarly indicated significant decreases in observed count rates (see analogous 20% proppant fill data presented in Table 2B below).

TABLE 2B

Neutron count rate sensitivity to Gd$_2$O$_3$ proppant in the borehole annular (cement) region as well as in a fractured formation.
Formation with Fracture and/or Annulus Containing Gd$_2$O$_3$ Proppant

| Formation | Annular region | Fracture | Near Count Rate | % Change from Undoped Proppant | Far Count Rate | % Change from Undoped Proppant | Xfar Count Rate | % Change from Undoped Proppant |
|---|---|---|---|---|---|---|---|---|
| ø = 28.3% with 0.4 cm wide fracture | Proppant - undoped | Proppant - undoped | 8984.5 | 0 | 845.05 | 0 | 68.507 | 0 |
| ø = 28.3% with 0.4 cm wide fracture | Proppant + 0.27% Gd$_2$O$_3$ | Proppant - undoped | 6732.1 | −25.1% | 599.39 | −29.1% | 47.591 | −30.5% |
| ø = 28.3% with 0.4 cm wide fracture | Proppant + 0.054% Gd$_2$O$_3$ | Proppant - undoped | 7434.9 | −17.2% | 674.7 | −20.2% | 54.656 | −20.2% |
| ø = 28.3% with 0.4 cm wide fracture | Proppant + 0.27% Gd$_2$O$_3$ | Proppant + 0.27% Gd$_2$O$_3$ | 6708.6 | −25.3% | 591.03 | −30.1% | 47.889 | −30.1% |
| ø = 28.3% with 0.4 cm wide fracture | Proppant + 0.054% Gd$_2$O$_3$ | Proppant + 0.27% Gd$_2$O$_3$ | 7244.7 | −19.4% | 653.36 | −22.7% | 53.182 | −22.4% |
| ø = 28.3% with 0.4 cm wide fracture | Proppant + 0.45% Gd$_2$O$_3$ | Proppant + 0.45% Gd$_2$O$_3$ | 6555.5 | −27.0% | 579.8 | −31.4% | 46.842 | −31.6% |

Table 2B, with 0.27% gadolinium oxide replacing the 1% boron carbide in the proppant, indicates that approximately 25-30% decreases in count rate are observed with $Gd_2O_3$ tagged proppant relative to untagged proppant in the annulus. This is roughly the same effect as observed in Table 2A with 1% $B_4C$ in the annulus. The data in Table 2B also illustrates the significance of a lower percentage (20%) fill of the annulus with the tagged proppant, where the concentration of $Gd_2O_3$ was reduced by a factor of five to 0.054%. It can be seen that even with only a 20% fill of the annulus with tagged proppant and the remainder with untagged proppant (or cement), the observed count rate drops significantly (about 15-20%), which is about three times as large as the decrease with 0.27% $Gd_2O_3$ proppant filling a 0.4 cm fracture (see FIG. 4I). In Table 2B, as in the data in Table 2A, the effect of tagged proppant in the fracture is mostly masked when tagged proppant is also present in the borehole annulus. It can also be seen from the data with the highest (0.45%) $Gd_2O_3$ concentration, that increasing the $Gd_2O_3$ concentration above 0.27% has only a small incremental effect on the count rate decreases (similar to the results seen in FIGS. 4A-4L). From Tables 2A and 2B, it can be seen that similar results are obtained regardless of whether $B_4C$ or $Gd_2O_3$ is used to tag the proppant.

The data in Table 3 illustrates the sensitivity of the neutron count rates to a change in the borehole fluid salinity (BFS), from the non-saline fluids described in the above figures to fluids with salinities up to 250 Kppm NaCl (the salinity of saturated salt water).

TABLE 3

The sensitivity of neutron count rate to borehole fluid salinity (BFS).

| % of $B_4C$ in Proppant in 1.0 cm Fracture in Formation | Borehole Fluid Salinity [Kppm NaCl] | NEAR [cps] | FAR [cps] | XFAR [cps] |
|---|---|---|---|---|
| 1% $B_4C$ | 0 | 7563.30 | 678.00 | 54.18 |
| " | 50 | 6487.90 | 580.95 | 47.25 |
| " | 100 | 5829.10 | 514.43 | 41.83 |
| " | 150 | 5317.90 | 468.58 | 38.32 |
| " | 200 | 4879.90 | 437.07 | 35.55 |
| " | 250 | 4607.90 | 409.82 | 33.33 |
| 0% $B_4C$ | 0 | 8389.70 | 772.11 | 62.16 |
| " | 50 | 7246.60 | 671.63 | 54.34 |
| " | 100 | 6508.10 | 597.32 | 48.66 |
| " | 150 | 5990.70 | 547.81 | 44.94 |
| " | 200 | 5595.10 | 508.74 | 40.96 |
| " | 250 | 5260.60 | 479.68 | 39.42 |

| % count rate difference: (1% $B_4C$—0% $B_4C$)/ (0% $B_4C$) at each BFS | Borehole Fluid Salinity (BFS) | % diff. | % diff. | % diff. |
|---|---|---|---|---|
| | 0 | −9.9% | −12.2% | −12.8% |
| | 50 | −10.5% | −13.5% | −13.1% |
| | 100 | −10.4% | −13.9% | −14.0% |
| | 150 | −11.2% | −14.5% | −14.7% |
| | 200 | −12.8% | −14.1% | −13.2% |
| | 250 | −12.4% | −14.6% | −15.4% |

As shown in Table 3, the borehole fluid salinity causes a large suppression in Near, Far, and Xfar count rates. For high borehole fluid salinities, the count rate decreases are much larger than the count rate decreases caused by the presence of boron carbide in the proppant in the fracture. For instance, in a formation with 1% $B_4C$ doped proppant in the fracture, if the borehole fluid salinity were to change from 0 Kppm to 150 Kppm, the count rate in the near detector will decrease by 29.7% ((5317.9−7563.3)/7563.3). This decrease is about 2-3 times larger than the approximately 10-15% decreases in count rate in Table 1 caused by changing the concentration of boron carbide in the proppant in the fracture. The borehole fluid salinity related count rate decreases are also similar to or larger in magnitude relative to the frac signal with tagged proppant in the borehole annular region as shown in Tables 2A and 2B. Also, as shown in Table 3, regardless of borehole salinity, as long as the salinity does not change between the pre-fracture and post-fracture logs, the presence of boron carbide in the proppant in the fracture can easily be detected (10-15% reduction in count rate).

If borehole materials change between the pre-fracture and post-fracture log runs (such as a borehole salinity change as illustrated in Table 3), or if different thermal neutron tools or PNC tools are utilized for the two log runs (for example, compensated neutron tools run by different service companies in the pre-fracture and post-fracture logs), or if the neutron output of the sources used in the pre-fracture and post-fracture logs is different, it will likely be necessary to normalize the log responses, preferably in logged intervals or zones known to be outside of the interval where induced fracturing is possible. It may also be possible in many situations to eliminate the pre-fracture log entirely if a prior neutron log, pulsed neutron log, or compensated neutron log has already been run in the well. That log, possibly also normalized to the post-fracture log as described above, could be substituted for the pre-fracture log.

For example and not limitation, referring back to Table 3, if large changes in fluid salinity were to take place between log runs collected before versus after the frac job, the resulting count rate change would likely be difficult to interpret without the use of normalization techniques. However, since this approximate salinity-based count suppression will be observed up and down the borehole as well as in the fracture interval, it is possible to normalize the count rates from the pre-fracture and post-fracture log runs outside the frac interval of interest, and preferably with the normalization utilizing zones with similar porosity to the formation(s) being fractured. A similar normalization procedure might be required if different tools or neutron sources are used for pre-fracture and post-fracture log runs, or if a pre-existing or synthesized neutron, compensated neutron, or PNC log is used to substitute for the pre-fracture log.

It should be pointed out that when using the above described methods involving count rate changes between the pre-frac and post-frac count rate logs to indicate the presence of tagged proppant (and hence induced fractures), in some instances where it is anticipated that gas saturation (hydrogen index) changes may also occur between the pre-frac and post-frac logs, it might be advantageous to emphasize data in the near detector for making the comparisons. Percentage changes in count rate in the near detector due to changes in hydrogen index are significantly smaller than in longer spaced detectors (see Table 1), however the percentage change in count rate in each of the detectors due to the presence of doped proppant is more or less independent of detector (see FIGS. 4A-4L). Hence use of the near detector (as opposed to the longer spaced detectors) would effectively emphasize proppant related count rate changes relative to hydrogen index related count rate changes.

The data shown in Table 4 demonstrates the limited sensitivity of compensated neutron near/far detector count rate ratios to the presence of the boron carbide doped proppant relative to the sensitivity of the ratio to changes in formation porosity. The near/far detector count ratios (N/F) with and without boron carbide doped proppant are shown for various formation and borehole conditions. There appear to be only small ratio increases with the proppant present. From this data, and the count rate data in Tables 1 and 2A, FIGS. 4A-4F, and FIGS. 5A-5B it can be seen that a dual spaced thermal neutron ratio is influenced significantly less by the presence of boron carbide doped proppant than the individual count rates themselves. A similar ratio insensitivity was observed with $Gd_2O_3$ replacing $B_4C$ in the proppant.

In all of the data in Table 4, the proppant contains 1% boron carbide, and the fractures are 1 cm wide, and the geometry is the "para" position shown in FIG. 3A. On all runs, the one standard deviation statistical uncertainty in each ratio is +/−2% (or less) of the ratio value. Since compensated neutron tools use a ratio to determine formation porosity, it is possible to use the count rate decreases observed in the post-fracture logs to indicate fractures, while simultaneously using the post-fracture count rate ratio data to indicate formation porosity, virtually independent of the presence of the proppant and fracture.

Figure 10:
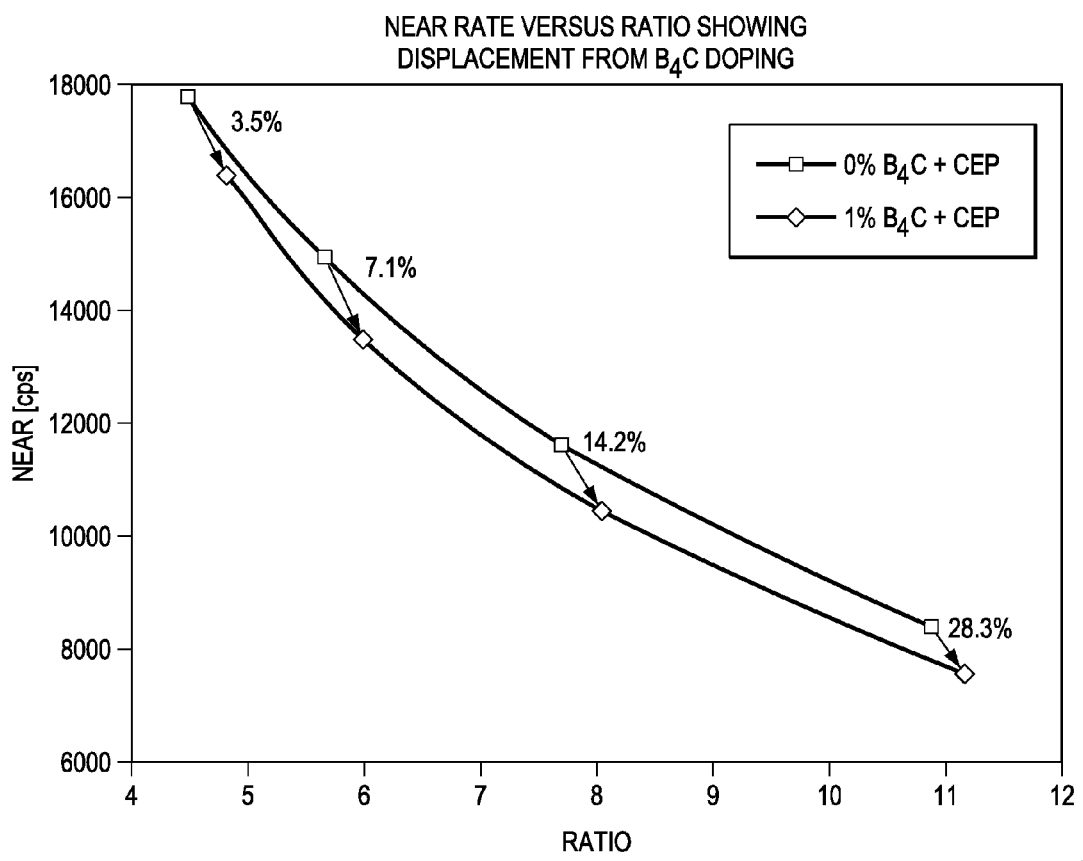
FIG. 10 is a cross-plot of the NEAR thermal neutron count rate versus the RATIO of the NEAR thermal neutron count rate to the FAR thermal neutron rate at 0% and 1% boron carbide ($B_4C$) concentration in proppant (CEP). This figure also depicts the displacement in both count rates and ratio values as $B_4C$ concentration increases from 0% to 1% across the range of formation porosities (hydrogen indices) displayed in this figure.

Other valuable information regarding fracture identification can also be observed from the data in Table 4 and Table 1, and in FIGS. 8, 9, and 10, all of which were derived from data in Table 1. The detector count rate changes in Table 1 were caused hydrogen index changes resulting from changing the formation porosity, however similar changes in count rates will result from changing the hydrogen index in a given formation via a change in gas saturation in the pore space and/or fracture. Should the hydrogen index of the formation change between the pre-fracture and post-fracture logs due to a change in the gas saturation in the formation/fracture, changes in the count rates in all of the detectors will be observed. These count rate changes due to hydrogen index changes might make it difficult to isolate, identify and/or quantify count rate changes caused by the presence of the of the doped proppant in the fracture and/or borehole region. However, from Table 4 it can be seen that the neutron count rate ratio is sensitive to hydrogen index changes in the formation, but is virtually independent of the presence of the proppant.

FIGS. 8 and 9 present a portion of this tabular information in graphical form. In FIG. 8, the relationship between the formation hydrogen index and the count rate in the near detector is illustrated. The upper curve illustrates the relationship with no fracture present. The lower curve is the relationship between the formation hydrogen index and the near count rate with 1% B4C in a 1.0 cm. wide induced fracture in the formation. From FIG. 8 it can be seen that across a wide range in formation porosities, the observed count rates with tagged proppant present are significantly lower than in the same formations with no proppant present. If the upper curve were used as illustrative of a predetermined calibrated relationship between hydrogen index and count rate, then with tagged proppant present, the lower count rates observed would translate into higher computed apparent hydrogen index values (2-5 porosity units higher). In FIG. 9, similar data is plotted for the relationships between the formation hydrogen index and a dual-spaced (near/far) count rate ratio. Note that in FIG. 9, there is virtually no difference between this relationship without proppant present versus the relationship with tagged proppant in a fracture. Therefore if the slightly lower curve (with no fracture present) were used to define a predetermined relationship between hydrogen index and ratio, then the apparent hydrogen index computed with tagged proppant present would differ only slightly (less than 1 porosity unit) from that obtained with no proppant present.

One way to qualitatively interpret observed count rate changes between the pre-frac and post-frac logs would be to combine the ratio data with the count rate data. If little or no change in ratio was observed between the pre-frac and post-frac logs, one could confidently assume that any observed count rate changes were due to the proppant. If both the ratio and the count rate change significantly between the logs (or if the ratio changes significantly and the count rate doesn't change significantly), then further discrimination is required to determine how much of the changes were due to the proppant versus a change in formation hydrogen index. One way to do this would be to utilize the relationship for determining hydrogen index (porosity) in a given detector from the observed count rate (common practice in single detector neutron tools), as illustrated in FIG. 8, and then compare this computed hydrogen index to that indicated from the count rate ratio, which is illustrated in FIG. 9. If the predetermined relationship between hydrogen index and count rate and the predetermined relationship between hydrogen index and ratio properly reflect the borehole environment in the well, the two pre-frac hydrogen index logs should overlay, since no proppant is present. If these pre-frac hydrogen index logs do not agree, then the procedure previously described herein is used to adjust the predetermined relationship between count rate and hydrogen index until the two hydrogen indices computed from the pre-frac ratio and cont rate agree across the logged interval, and especially in the interval where fracturing is anticipated. The hydrogen indices computed from the post-frac count rate and from the post-frac count rate ratio will also overlay if no proppant is present, even if the hydrogen index (gas saturation) of the formation changes between the pre-frac and post-frac log runs (if the gas saturation were to change, then each of the computed post-frac hydrogen index curves would be shifted by the same amount from the corresponding hydrogen index curve computed from the pre-frac log). On the other hand, in zones where proppant is present when the after frac log is run, then the hydrogen index computed from the post-frac count rate will be higher than that computed from the post-frac count rate ratio, as seen in the data in FIGS. 8 and 9.

If one is confident that the predetermined relationships between hydrogen index and count rate and between hydrogen index and ratio are sufficiently accurate for the borehole conditions anticipated in the well, then it is possible to eliminate the pre-frac log altogether. In that event, all that is required is a comparison of the hydrogen index computed from the post-frac count rate versus the hydrogen index computed from the post-frac near/far ratio. In zones where the count rate based hydrogen index is higher, then tagged proppant is present, regardless of the gas saturation of the formation. When using this method, it should be noted that since detectors farther from the source are less affected by borehole conditions than detectors closer to the source, it might be preferable in some situations to the utilize a longer spaced detector for the count rate based hydrogen index measurement. This would minimize any borehole related errors in the relationship between count rate and hydrogen index. On the other hand, as previously mentioned herein, in the near detector (as compared to a farther spaced detector), the percentage change in count rate due to a change in tagged proppant concentration is large relative to the change in the detector count rate due to a hydrogen index change. Therefore in many situations, it may be advisable to select the near detector for the count rate measurement in order to produce larger changes in apparent hydrogen index when tagged proppant is present. If one is not confident that the predetermined relationship to compute apparent hydrogen index from the count rate is sufficiently accurate for the borehole conditions encountered in the well, or if the borehole conditions change significantly between the pre-frac log and the post-frac log, then that predetermined relationship is adjusted using the procedure previously described herein.

Another method for combining count rate ratio and detector count rate to locate zones containing tagged proppant involves the use of a ratio vs. count rate crossplot, as illustrated in FIG. 10. FIG. 10 (using data from Table 1) visualizes the effect of boron carbide ($B_4C$) concentration in a proppant on measured near detector thermal neutron count rate, crossplotted versus the near/far detector count rate ratio. As described earlier, since both near count rate and ratio are sensitive to formation hydrogen index (porosity), a crossplot of these variables across logged intervals containing no tagged proppant will result in a well defined trend/trendline on the crossplot. Since near count rate is also very sensitive to tagged proppant, but the near/far ratio is not (as previously shown in FIGS. 8 and 9), points on the crossplot representing zones containing proppant will fall off of this proppant-free trend/trendline. The upper curve in FIG. 10 is the proppant-free trendline for the data from Table 1, with the four points along this trendline representing four formations with different hydrogen index (porosity) values. This trendline may be even better defined in a field log if environmental corrections have been separately applied to both the near count rate and to the ratio to correct for borehole diameter, tool standoff, borehole salinity, etc. This upper curve forms the trendline/trajectory along which points "move" as formation hydrogen index changes. If points fall off this trendline (in the SSE direction), then the presence of tagged proppant (in this case $B_4C$) is indicated. The lower curve shown in FIG. 10 represents a second trendline/trajectory for zones of varying hydrogen index containing tagged proppant. The four data points on the lower curve represent formations having the same HI values as the corresponding points on the upper trendline, however all of these lower points represent the formations with fractures containing ceramic CEP proppant tagged with 1% $B_4C$). In the same four formations, as proppant concentration increases from 0% to 1%, the arrows on the plot indicate the progressive "movement" the crossplotted points would take. A similar effect would be observed as the width of a proppant-containing fracture increases. This type of crossplot data may form the basis of software algorithms used in real-time and/or post-processing to identify these zones containing the proppant tagged with $B_4C$ (or $Gd_2O_3$, or some other thermal neutron absorber).

This type of ratio-count rate crossplot can be of use whether or not a pre-frac log is available. If a pre-frac log is available, as long as borehole conditions do not change across the logged interval (or if environmental corrections have been applied to the data), all the data should form a trend/trendline, such as the upper curve in FIG. 10. In a corresponding post-frac log crossplot, the same trend/trendline should be observed in zones which do not contain tagged proppant. If that is not the case, the implication is that borehole conditions have changed between the pre-frac log and the post-frac log (since count rate is more sensitive to borehole changes than the ratio), and that information can be used to determine whether count rate normalization processes are necessary prior to using the earlier-described pre-frac vs. post-frac count rate overlay method to identify proppant containing zones. If a pre-frac log is not available, then the post-frac log can be processed without the use of pre-frac data by utilizing the crossplot method described above in relation to FIG. 10.

TABLE 4

Near/Far detector count ratios of a compensated neutron tool in the presence of boron carbide doped proppant.

| | Near/Far Detector Count Ratios |
|---|---|
| Base case: fresh water in borehole, 28.3% porosity formation | (a) No fracture present, N/F = 10.9 |
| | (b) Propped fracture present, N/F = 11.1 |
| | (c) Proppant in cement annulus but not fracture, N/F = 11.2 |
| | (d) Proppant in cement annulus and fracture, N/F = 11.2 |
| Base case: salt water (250 Kppm NaCl) in borehole, 28.3% porosity formation | (a) No fracture present, N/F = 11.0 |
| | (b) Propped fracture present, N/F = 11.2 |
| Base case: fresh water, 14.15% porosity formation | (a) No fracture present, N/F = 7.7 |
| | (b) Propped fracture present, N/F = 8.0 |
| Base case: fresh water, 7.1% porosity formation | (a) No fracture present, N/F = 5.67 |
| | (b) Propped fracture present, N/F = 5.98 |
| Base case: fresh water, 3.5% porosity formation | (a) No fracture present, N/F = 4.48 |
| | (b) Propped fracture present, N/F = 4.81 |

FIG. 7A is an exemplary neutron/compensated neutron well log comparison between pre-fracture and post-fracture data sets. The proppant used in the frac was tagged with a high thermal neutron capture cross section material. The locations and heights of the fractured intervals are determined by correlating the intervals having differences in the pre-fracture and post-fracture count rate data to the corresponding depth intervals in the well.

The observed count rates in all three detectors (near, far, and x-far) are reduced in the post-fracture logs in intervals of fracturing, regardless of whether proppant is in the borehole or in the fracture or in both. The absolute count rates are lower in the detectors farther from the source, and the fractional signals (separation between curves) may be slightly greater in the longer spaced detectors. The pre-fracture and post-fracture log normalization intervals above and/or below the potential frac interval are used to normalize the pre-fracture and post-fracture logs in the situations where log normalization is required.

EXAMPLE 2

PNC Tool

A PNC system having a 14-MeV pulsed neutron generator was modeled using MCNP5 to determine the height of a fracture in a formation. Decay curve count rate data detected in thermal neutron or gamma ray sensors are recorded after fracturing the formation. As in the case of neutron and compensated neutron tools, the observed parameters are then compared to corresponding values recorded in a logging run made before the well was fractured, again preferably made with the same or a similar logging tool and with the same borehole conditions as the post-fracture log. The formation and borehole thermal neutron absorption cross-sections are calculated from the two-component decay curves. Increases in the formation and borehole thermal neutron absorption cross-sections in the post-fracture PNC logs relative to the pre-fracture logs, as well as decreases between the logs in the observed count rates and in computed formation and/or borehole component count rates and count rate integrals are used to identify the presence of boron carbide doped proppant in the induced fracture(s) and/or in the borehole region adjacent to the fractured zone.

A PNC tool can be used for data collection and processing to enable observation of both count rate related changes and changes in computed formation and borehole thermal neutron capture cross-sections so as to identify the presence of the neutron absorber in the proppant.

In current "dual exponential" PNC tools, as disclosed in SPWLA Annual Symposium Transactions, 1983 paper CC entitled Experimental Basis For A New Borehole Corrected Pulsed Neutron Capture Logging System (Thermal Multigate Decay "TMD") by Shultz et al.; 1983 paper DD entitled Applications Of A New Borehole Corrected Pulsed Neutron Capture Logging System (TMD) by Smith, Jr. et al.; and 1984 paper KKK entitled Applications of TMD Pulsed Neutron Logs In Unusual Downhole Logging Environments by Buchanan et al., the equation for the detected count rate c(t), measured in the thermal neutron (or gamma ray) detectors as a function of time between the neutron bursts can be approximated by Equation 1:

$$c(t)=A_{bh}\exp(-t/\tau_{bh})+A_{fm}\exp(-t/\tau_{fm}), \quad (1)$$

where t is time after the neutron pulse, $A_{bh}$ and $A_{fm}$ are the initial magnitudes of the borehole and formation decay components at the end of the neutron pulses (sometimes called bursts), respectively, and $\tau_{bh}$ and $\tau_{fm}$ are the respective borehole and formation component exponential decay constants. The borehole and formation component capture cross-sections $\Sigma_{bh}$ and $\Sigma_{fm}$ are inversely related to their respective decay constants by the relations:

$$\tau_{fm}=4550/\Sigma_{fm}, \text{ and } \tau_{bh}=4550/\Sigma_{bh}, \quad (2)$$

where the cross-sections are in capture units and the decay constants are in microseconds.

An increase in the capture cross-section $\Sigma_{fm}$ will be observed in the post-fracture logs with proppant in the formation fractures relative to the pre-fracture pulsed neutron logs. Fortunately, due to the ability in PNC logging to separate the count rate signals from the borehole and formation, there will also be a reduced sensitivity in the formation capture cross-section to any unavoidable changes in the borehole region (such as borehole salinity or casing changes) between the pre-fracture and post-fracture pulsed neutron logs, relative to situations in which neutron or compensated neutron tools are used to make the measurements.

The formation component count rate will also be affected (reduced) by the presence of boron-containing absorbers in the proppant in the fractures, especially in PNC tools having gamma ray detectors. The formation component count rate will also be reduced with boron present in the borehole region, since many of the thermal neutrons primarily decaying in the formation may actually be captured in the borehole region (this is the same reason a large number of iron gamma rays are seen in spectra from time intervals after the neutron bursts dominated by the formation decay component, although the only iron present is in the well tubular(s) and tool housing in the borehole region).

Since most modern PNC tools also measure the borehole component decay, an increase in the borehole capture cross-section $\Sigma_{bh}$ and a change in the borehole component count rate (especially if boron carbide is used as the high thermal neutron capture cross section material) in the post-fracture log relative to the pre-fracture log could indicate the presence of proppant in the vicinity of the borehole, which is also usually indicative of the presence of induced fracturing in the adjacent formation.

Figure 6A:
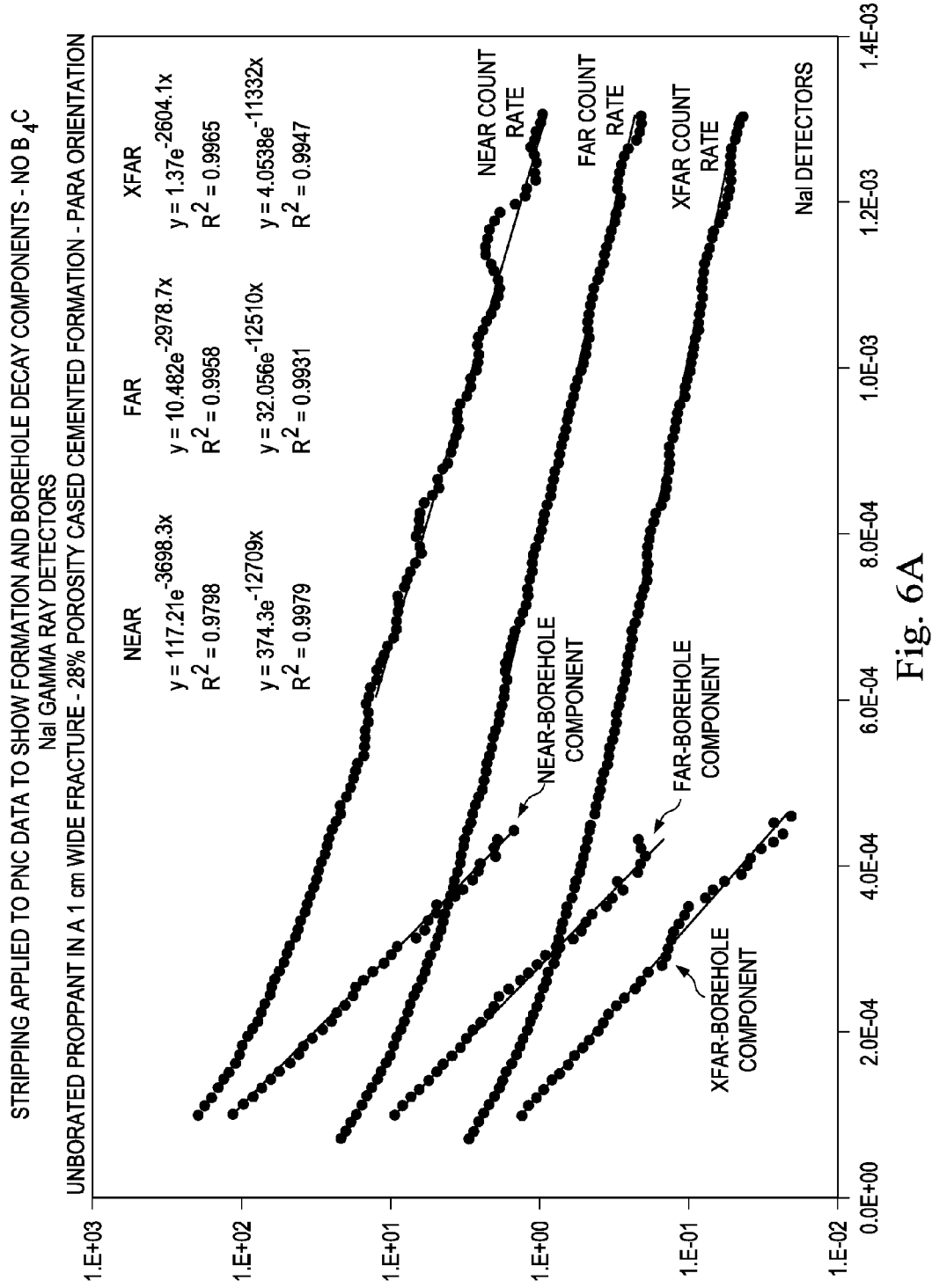
FIGS. 6A-6B show modeled points along the decay curves of detected thermal neutron capture gamma rays using a 14 MeV Pulsed Neutron Generator.
Figure 6B:
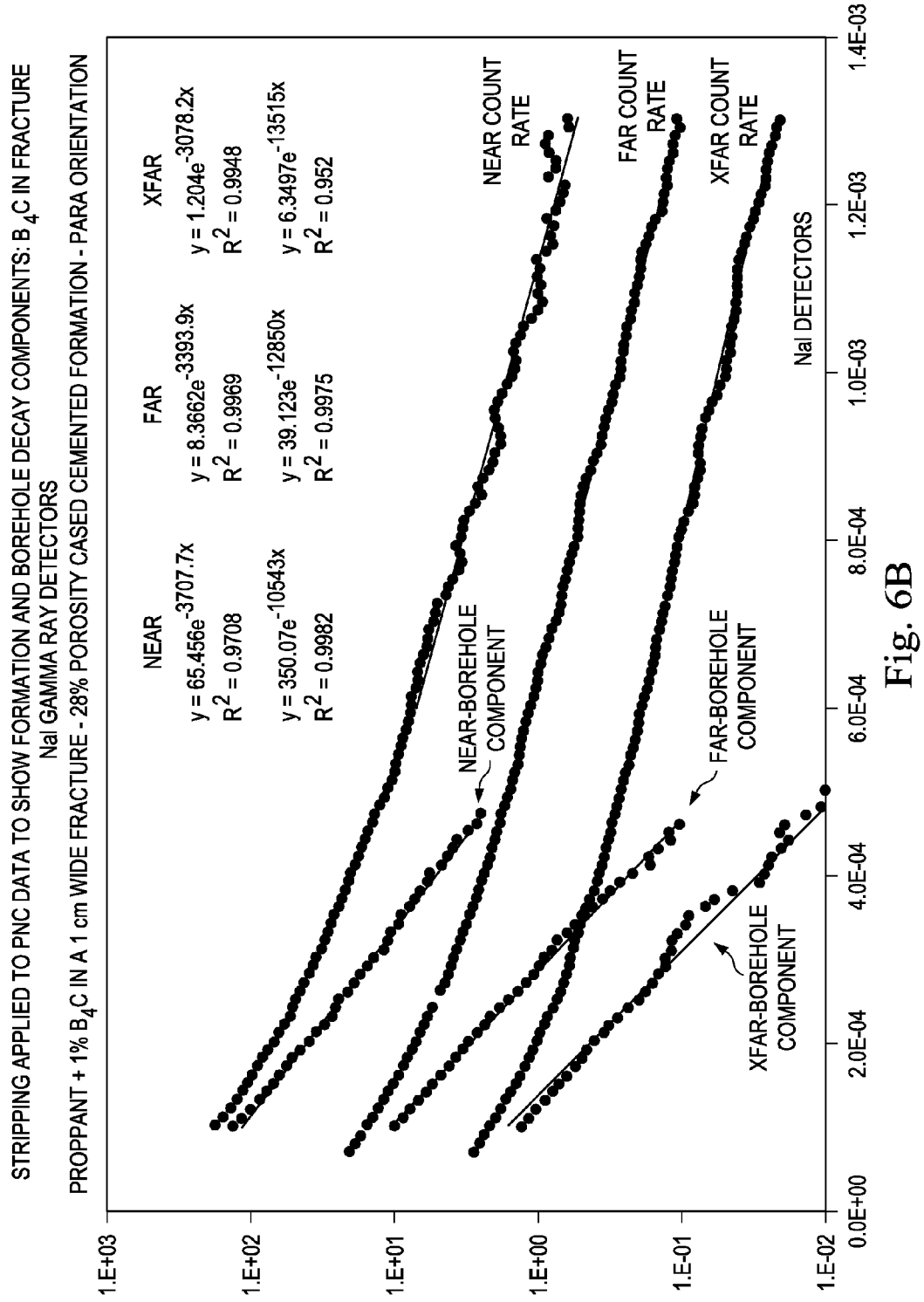
Figure 6C:
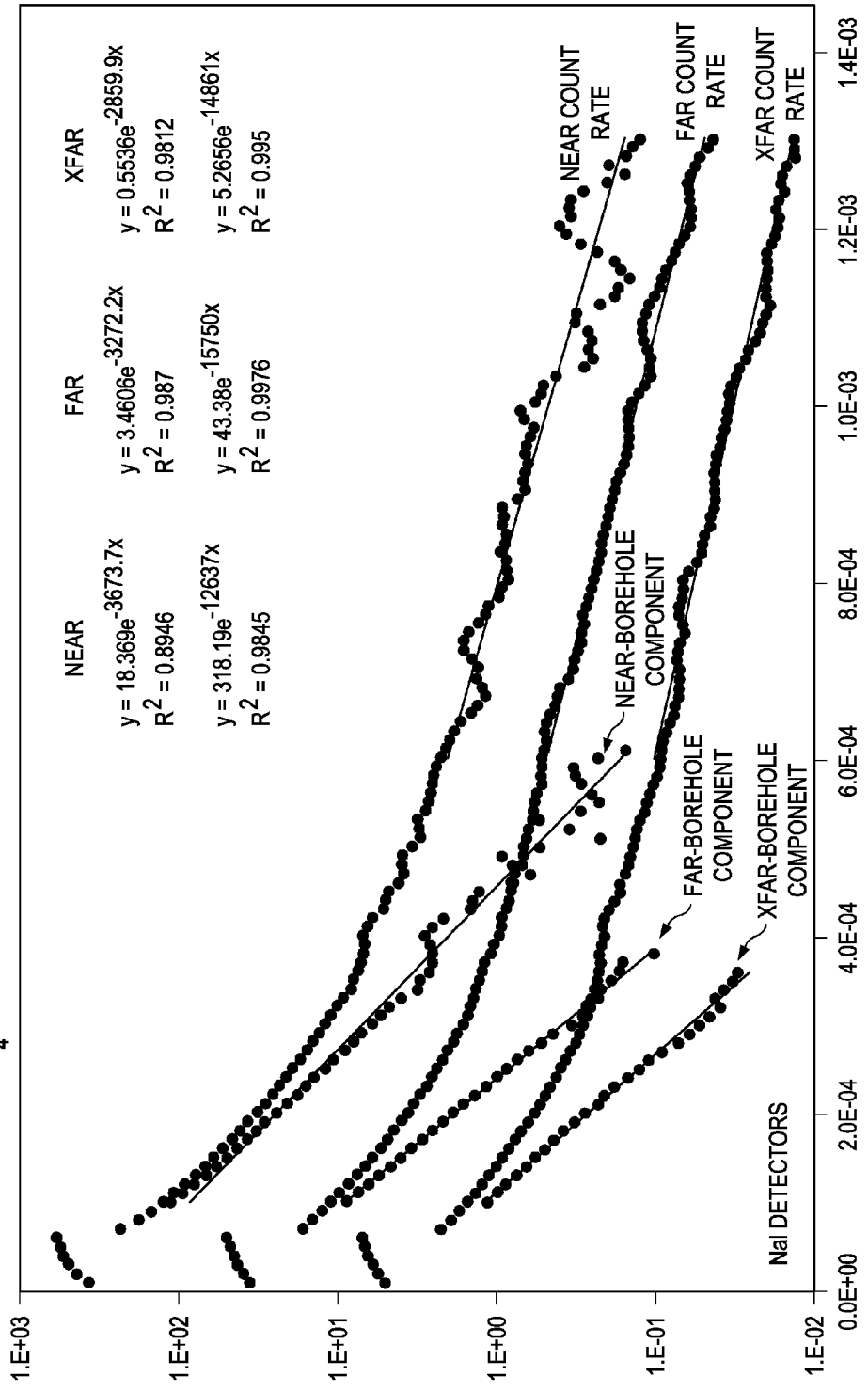
FIG. 6C shows similar decay curves obtained with tagged proppant in the borehole annulus instead of the formation fractures.

FIGS. 6A-6C and Tables 5A and 5B show MCNP5 modeled results for the PNC tool embodiment of the present invention. NaI gamma ray detectors were used in all of the PNC models. The data was obtained using a hypothetical 1.6875 inch diameter PNC tool to collect the pre-fracture data (FIG. 6A), and the post-fracture data (FIG. 6B) data with proppant having 1.0% boron carbide in a 1.0 cm wide fracture in a 28.3% porosity formation. FIG. 6C illustrates post-fracture data with proppant having 1.0% boron carbide proppant in the annular (cement) region instead of in the fractures in the formation. Unless otherwise noted, borehole and formation conditions are the same as described in FIG. 3A. The source-detector spacings are the same as those utilized in the previous neutron log examples. In FIGS. 6A-6C, the total count rates in each time bin along each of the decay curves are represented as points along the time axis (x axis). The near detector decay is the slowly decaying upper curve in each figure, the far detector decay is the center curve, and the x-far detector decay is the lower curve. The computed formation decay components from the two exponential fitting procedures are the more slowly decaying exponentials (the solid lines in the figures) plotted on the total decay curve points in each figure (for each detector). The divergence of the decay curve in the earlier portions of the curve from the solid line is due to the additional count rate from the more rapidly decaying borehole component. The points representing the more rapidly decaying borehole region decay shown in the figures were computed by subtracting the computed formation component from the total count rate. Superimposed on each of the points along the borehole decay curves are the lines representing the computed borehole exponential equations from the two exponential fitting algorithms. The $R^2$ values associated with each computed exponential component in FIGS. 6A-6C reveal how closely the computed values correlate to the actual data, with 1.0 indicating a perfect fit. The good fits between the points along the decay curves and the computed formation and borehole exponential components confirm the validity of the two exponential approximations.

Table 5A displays the computed formation and borehole information from FIGS. 6A and 6B, and also similar information from decay curves computed with the fractures in the perp orientation relative to the tool (see FIG. 3B). As seen in Table 5A, although the formation component capture cross-sections, $\Sigma_{fm}$, are not observed to change as much as would be computed from purely volumetric considerations, there are nevertheless appreciable (up to 18%) increases observed in $\Sigma_{fm}$ with the boron carbide doped proppant in the fracture, depending on detector spacing. Also from Table 5A, it can be seen that the orientation of the tool in the borehole relative to the fracture (para vs. perp data) is not as significant as was observed for the compensated neutron tools. When 0.27% $Gd_2O_3$ (as opposed to 1.0% $B_4C$) was modeled in the MCNP5 software as the high capture cross section material in the proppant, $\Sigma_{fm}$ increased in a similar manner as discussed above with respect to boron carbide. Also, from Equation 1, the integral over all time of the exponentially decaying count rate from the formation component as can be computed as $A_{fm}*\Sigma_{fm}$, where $A_{fm}$ is the initial magnitude of the formation decay component and $\tau_{fm}$ is the formation component exponential decay constant. The computed formation component $A_{fm}*\tau_{fm}$ count rate integral decreases about 22-44% with the boron carbide doped proppant in the fracture, which is a significant fracture signal. The observed count rate decay curves summed over a given time interval after the neutron bursts in which the formation component count rate dominates (for example 400-1000 μsec) could be substituted for $A_{fm}*\Sigma_{fm}$, however with some reduction in sensitivity and/or accuracy. In contrast to proppant containing 1.0% $B_4C$, when 0.27% $Gd_2O_3$ was modeled in the MCNP5 software as the high capture cross section material in the proppant, there was not a large count rate related decrease in $A_{fm}*\Sigma_{fm}$, since gadolinium, unlike boron, emits gamma rays following thermal neutron capture. Some changes are also observed in Table 5A for the borehole component cross-sections and count rates. These changes, although also potentially useful for frac identification, do not appear to be as systematic as the changes in the formation component data, since proppant in formation fractures primarily affects PNC formation, as opposed to borehole, parameters.

more realistic partial filling of the annulus with tagged proppant. Table 5B represents data collected to show the effects of 0.2% $B_4C$ doped proppant in the borehole annulus (cement region) on PNC tools. This $B_4C$ concentration is representative of a 20% fill of the annulus with a proppant tagged with 1% $B_4C$. $\Sigma_{fm}$, and $\Sigma_{bh}$, increase with the proppant in the borehole annulus. Particularly with proppant in the annulus,

TABLE 5A

Computed formation and borehole count rate parameters and formation and borehole capture cross-sections from the data illustrated in FIGS. 6A-6B. Also shown are similar PNC data for perp orientation of tool relative to the fracture.

| Detector | $B_4C$ in proppant | $\Sigma_{fm}$ capture units | $\tau_{fm}$ microsec. | Formation component intercept | Formation $A_{fm}*\tau_{fm}$ (×1/1000) | $\Sigma_{bh}$ capture units | $\tau_{bh}$ microsec. | Borehole component intercept | Borehole $A_{bh}*\tau_{bh}$ (×1/1000) |
|---|---|---|---|---|---|---|---|---|---|
| Near para | 0% | 16.81 | 270.6722 | 117.21 | 31.725491 | 57.82 | 78.69249 | 374.3 | 29.4546 |
| | 1% | 16.85 | 270.0297 | 65.46 | 17.676142 | 47.97 | 94.85095 | 350.07 | 33.20447 |
| (1%-0%)/0% | | 0.0% | | | -44% | -17% | | | 13% |
| Far para | 0% | 13.54 | 336.0414 | 10.48 | 3.5217134 | 56.92 | 79.93675 | 32.06 | 2.562772 |
| | 1% | 15.43 | 294.8801 | 8.37 | 2.4681465 | 58.46 | 77.831 | 39.12 | 3.044749 |
| (1%-0%)/0% | | 14% | | | -30% | 3% | | | 19% |
| Xfar para | 0% | 11.84 | 384.2905 | 1.37 | 0.526478 | 51.56 | 88.2467 | 4.05 | 0.357399 |
| | 1% | 13.99 | 325.2323 | 1.2 | 0.3902788 | 61.49 | 73.99577 | 6.35 | 0.469873 |
| (1%-0%)/0% | | 18% | | | -26% | 19% | | | 31% |
| Near perp | 0% | 17.55 | 259.2593 | 137.21 | 35.572963 | 58.83 | 77.34149 | 299.3 | 23.14831 |
| | 1% | 18.84 | 241.5074 | 103.69 | 25.041906 | 57.87 | 78.6245 | 407.2 | 32.0159 |
| (1%-0%)/0% | | 7% | | | -30% | -1.6% | | | 38% |
| Far perp | 0% | 13.11 | 347.0633 | 9.57 | 3.3213959 | 51.69 | 88.02476 | 30.56 | 2.690037 |
| | 1% | 14.69 | 309.7345 | 8.08 | 2.5026549 | 51.64 | 88.10999 | 31.65 | 2.788681 |
| (1%-0%)/0% | | 12% | | | -25% | 0.0% | | | 4% |
| Xfar perp | 0% | 11.79 | 385.9203 | 1.33 | 0.513274 | 43.98 | 103.4561 | 3.08 | 0.318645 |
| | 1% | 13.64 | 333.5777 | 1.2 | 0.4002933 | 49.95 | 91.09109 | 3.74 | 0.340681 |
| (1%-0%)/0% | | 16% | | | -22% | 14% | | | 7% |

Plain cement is present in the borehole annulus. NaI gamma ray detectors modeled.

TABLE 5B

Computed formation and borehole count rate parameters and formation and borehole capture cross-sections with 0.2% $B_4C$ in the annular (cement) region.

| Detector | $B_4C$ in proppant | $\Sigma_{fm}$ capture units | $\tau_{fm}$ microsec. | Formation component intercept | Formation $A_{fm}*\tau_{fm}$ (×1/1000) | $\Sigma_{bh}$ capture units | $\tau_{bh}$ microsec. | Borehole component intercept | Borehole $A_{bh}*\tau_{bh}$ (×1/1000) |
|---|---|---|---|---|---|---|---|---|---|
| Near Para | 0% | 16.81 | 270.6722 | 117.21 | 31.725491 | 57.82 | 78.69249 | 374.3 | 29.4546 |
| | only 0.2% | 18.25 | 249.3151 | 58.2 | 14.510137 | 71.6 | 63.54749 | 622.3 | 39.5456 |
| (0.2%-0%)/0% | | 9% | | | -54% | 24% | | | 34% |
| Far Para | 0% | 13.54 | 336.0414 | 10.48 | 3.5217134 | 56.92 | 79.93675 | 32.06 | 2.562772 |
| | only 0.2% | 14.35 | 317.0732 | 5.43 | 1.7217073 | 60 | 75.83333 | 38.4 | 2.912 |
| (0.2%-0%)/0% | | 6% | | | -51% | 5% | | | 14% |
| Xfar Para | 0% | 11.84 | 384.2905 | 1.37 | 0.526478 | 51.56 | 88.2467 | 4.05 | 0.357399 |
| | only 0.2% | 12.89 | 352.9868 | 0.853 | 0.3010978 | 60.3 | 75.45605 | 5.16 | 0.389353 |
| (0.2%-0%)/0% | | 9% | | | -43% | 17% | | | 9% |

There is no $B_4C$ in the proppant in the fractures. NaI gamma ray detectors modeled.

FIG. 6C indicates that increases in formation, and particularly borehole, component cross sections, and large decreases (up to 85% reductions) in both formation and borehole component count rates are observed with 1.0% $B_4C$ tagged proppant filling the cement annulus. However, since it is unlikely that the entire borehole annulus would be filled with proppant, similar modeling data was also collected representing the computed formation component count rate $A_{fm}*\Sigma_{fm}$ decreases substantially—about 50%. $A_{bh}*\Sigma_{bh}$ can change as well, but not nearly as much. These changes indicate propped fractures, given the assumption that some of the borehole region adjacent to the propped fractured interval also contains the tagged proppant.

The effects described in Tables 5A and 5B can also be seen by visual observation of the decay curves in FIGS. 6A-6C. In comparing the three pre-fracture decay curves in FIG. 6A with the corresponding post-fracture curves in FIG. 6B and FIG. 6C, the formation components can be seen to decay more rapidly with the boron carbide doped proppant in the formation fractures (FIG. 6B), and also slightly with the boron carbide doped proppant in the cement annulus (FIG. 6C). On the other hand, the decay rates of the borehole components appear much less sensitive to the presence of the proppant in the fracture (FIG. 6B), but are very useful in identifying borehole proppant (FIG. 6C).

This reduced borehole component sensitivity to the proppant in the fracture can also be seen in the data in Table 5A, which shows $\Sigma_{bh}$ and $A_{bh}*\Sigma_{bh}$, computed from the decay data in FIGS. 6A and 6B for the pre-fracture and post-fracture decay curves. There are much smaller percentage changes in the borehole parameters $\Sigma_{bh}$ and $A_{bh}*\tau_{bh}$ between the pre-fracture and post-fracture decay data as compared to the percent change of the formation parameters $\Sigma_{fm}$ and $A_{fm}*\tau_{fm}$. This reduced borehole component sensitivity to the fracture is primarily due to the fact that the borehole region is not significantly different in these two situations (the fracture containing the proppant does not extend through the borehole region), and the borehole component is primarily sensing this region.

PNC formation parameters, as described earlier, are less sensitive than neutron or compensated neutron to changes in non-proppant related changes in borehole conditions between the pre-fracture and post-fracture logs (such as borehole fluid salinity changes or changes in casing conditions). This is due to the ability of PNC systems to separate formation and borehole components. This can be seen in the data in Table 6, where the salinity of the borehole fluid was changed from fresh water to salt water (102 Kppm NaCl). The formation parameters are virtually insensitive to this change, while both borehole parameters are highly sensitive to the salinity change. Hence formation parameter changes due to the presence of tagged proppant will not be influenced by borehole condition changes between log runs. Also, changes in borehole parameters, coupled with the absence of changes in formation parameters, can be used to identify the places where the borehole region has changed between logs, since that change may also be of interest.

sensitive to most borehole region changes, as seen above. If a PNC tool measuring thermal neutrons instead of gamma rays is employed, $\Sigma_{fm}$ will also be sensitive to formation changes (tagged fractures) and relatively insensitive to borehole region changes. $A_{fm}*\tau_{fm}$ will also be sensitive to the presence of proppant in the borehole, in part since the thermal neutrons will be additionally attenuated traversing this high capture cross-section borehole annulus between the formation and the detectors in the logging tool. The borehole decay parameters ($\Sigma_{bh}$ and $A_{bh}*\tau_{bh}$), like those measured in a PNC tool containing gamma ray detectors, are less sensitive than $\Sigma_{fm}$ and $A_{fm}*\tau_{fm}$ to changes in the formation, but borehole parameters, and especially $\Sigma_{bh}$, are very sensitive to tagged proppant in the borehole. Hence in a PNC tool containing thermal neutron detectors, the changes in all four parameters ($\Sigma_{fm}$, $A_{fm}*\tau_{fm}$, $\Sigma_{bh}$ and $A_{bh}*\tau_{bh}$) will generally be affected in the same way by tagged proppant as PNC tools containing gamma ray detectors. If boron is used as the high cross section proppant tagging material, the observed count rate decreases will likely be relatively smaller in tools with thermal neutron detectors than in tools with gamma detectors, due to the aforementioned absence of capture gamma rays following neutron capture by boron.

Changes in $\Sigma_{fm}$ and $A_{fm}*\tau_{fm}$ may be monitored if a difficult to quantify change in borehole region conditions (such as changes in borehole fluid salinity or casing conditions) has occurred between the log runs. Since $\Sigma_{fm}$ is not very sensitive to changes in the borehole region, $\Sigma_{fm}$ may be monitored if it is desired to emphasize detection of tagged proppant in the formation as opposed to tagged proppant in the borehole region. On the other hand, if some of the boron carbide doped proppant is located in the borehole region adjacent to an induced fracture, an increase in the computed borehole thermal neutron capture cross-section $\Sigma_{bh}$ will be observed in the post-fracture log relative to the pre-fracture log (changes in the borehole decay component count rates and $A_{bh}*\Sigma_{bh}$ would be less significant). These borehole parameter changes would be much less pronounced if the proppant had been in fractures in the formation. Another embodiment of the present invention provides for monitoring changes in $\Sigma_{bh}$ and $A_{fm}*\Sigma_{fm}$, and in come cases, $A_{bh}*\tau_{bh}$, (and a lack of change in $\Sigma_{fm}$) to detect proppant located in the borehole region.

An exemplary well log comparison of pre-fracture and post-fracture logs using a PNC tool with a capture gamma ray

TABLE 6

A 102 Kppm NaCl Change in Borehole Salinity affects PNC Borehole Parameters but not PNC Formation Parameters

| Detector | Borehole salinity (Kppm NaCl) | $\Sigma_{fm}$ capture units | $\tau_{fm}$ microsec. | Formation component intercept | Formation $A_{fm}*\tau_{fm}$ (x1/1000) | $\Sigma_{bh}$ capture units | $\tau_{bh}$ microsec. | Borehole component intercept | Borehole $A_{bh}*\tau_{bh}$ (x1/1000) |
|---|---|---|---|---|---|---|---|---|---|
| Near | 0K | 16.81 | 270.6722 | 117.2 | 31.722784 | 57.82 | 78.69249 | 374.3 | 29.4546 |
|  | 102K | 17.06 | 266.7057 | 114.7 | 30.591149 | 89.24 | 50.9861 | 712.3 | 36.3174 |
| (102K-0K)/0K |  | 1% |  | −4% |  | 54% |  |  | 23% |
| Far | 0K | 13.53 | 336.2897 | 10.48 | 3.5243163 | 56.92 | 79.93675 | 32.06 | 2.562772 |
|  | 102K | 13.39 | 339.8058 | 9.33 | 3.1703883 | 69.5 | 65.46763 | 43.32 | 2.836058 |
| (102K-0K)/0K |  | 1% |  | −10% |  | 22% |  |  | 11% |
| Xfar | 0K | 11.84 | 384.2905 | 1.37 | 0.526478 | 51.56 | 88.2467 | 4.05 | 0.357399 |
|  | 102K | 12.17 | 373.8702 | 1.37 | 0.5122021 | 58.01 | 78.43475 | 5.59 | 0.43845 |
| (102K-0K)/0K |  | 3% |  | −3% |  | 13% |  |  | 23% |

Porosity = 28% - No B$_4$C in Fracture or Annulus - NaI Gamma Ray Detectors

Modern multi-component PNC tools detect gamma rays, which can be used to compute formation decay components (and hence both $\Sigma_{fm}$ and $A_{fm}*\tau_{fm}$) that are only minimally detector or a thermal neutron detector is shown in FIG. 7B, which is representative of data received from one of the detectors (i.e. the near, far, or x-far detectors). The proppant used in the frac was tagged with a high thermal neutron capture cross section material. Normalization of the pre-fracture and post-fracture logs in interval(s) outside of the suspected fractured zone may be required prior to making the comparison. $\Sigma_{fm}$ increases and $A_{fm}*\tau_{fm}$ decreases with tagged proppant only in the fracture, however $\Sigma_{bh}$ and $A_{bh}*\tau_{bh}$ have only limited sensitivity to fracture (formation) proppant. With tagged proppant only in the borehole, $\Sigma_{fm}$ is minimally affected, since borehole region changes do not tend to influence $\Sigma_{fm}$. $A_{fm}*\tau_{fm}$ decreases in the post-fracture log. $\Sigma_{bh}$ and $A_{bh}*\tau_{bh}$ are also both sensitive to the presence of tagged proppant in the borehole region ($\Sigma_{bh}$ increases and $A_{bh}*\Sigma_{bh}$ decreases). With tagged proppant in both the borehole and formation, all four log curves separate in the zone containing the proppant. Hence, since the four PNC log parameters ($\Sigma_{fm}$, $A_{fm}*\tau_{fm}$, $\Sigma_{bh}$ and $A_{bh}*\tau_{bh}$), when observed together, respond differently in all three of the above proppant location situations, one can determine whether proppant is present in the borehole region, or in a fracture, or in both by observing the changes, or lack of changes, in these parameters between the pre-fracture and post-fracture logs.

Although the above discussion has focused on comparing pre-fracture with post-fracture logs to detect the location of proppant tagged with high thermal neutron capture cross section materials (e.g. $B_4C$ or $Gd_2O_3$) to indicate induced fractures, a similar comparison of two (or more) compensated neutron or PNC logs run at different times after the frac job can also provide useful information. If there is a reduction over time in the amount of tagged proppant in the fracture and/or borehole region, a reversal of the changes described above will be observed between a post-fracture log run just after the frac job with a similar log run at a later time (after making any required log normalization). Increases in neutron or compensated neutron log count rates between the logs (or decreases in $\Sigma_{fm}$ and/or $\Sigma_{bh}$, and increases in $A_{fm}*\tau_{fm}$ for PNC logs) would indicate a reduction in the amount of proppant detected when the later post-fracture log was run. This reduction in the amount of proppant in place can provide useful information about the well. Any proppant reduction is likely caused by proppant being produced out of the well together with the oilfield fluids produced from the formation. Proppant reduction could indicate that the fracture is not as well propped as it was initially (and hence the possible requirement for another frac job or other remedial action). Reduced proppant could also indicate the fractured zones from which most of the production is coming, since proppant can only be produced from producing zones. No change in proppant could conversely be indicative of zones that are not producing, and hence provide information about zones that need to be recompleted. If PNC tools were used for these comparisons, it would also be possible to distinguish whether the proppant changes were coming from the borehole region or the formation fractures themselves, or both. If logs are run at multiple times after the first post-fracture log, then progressive changes could be monitored. Of course, it would also be useful to know whether a reduction in proppant detected was caused by a reduction in the quality of the propped fracture or caused by the zones with the highest production rates, or both. Resolving these effects might be possible by augmenting the post-fracture proppant identification logs with: (1) conventional production logs, (2) gamma ray logs to locate radioactive salt deposition in zones resulting from production, (3) acoustic logs to detect open fractures, (4) other log data, and/or (5) field information. It should be noted that this type of post-fracture information could not be obtained using fracture identification methods in which relatively short half life radioactive tracers are pumped downhole, since radioactive decay would make the subsequent post-fracture logs useless. This would not be a problem with the methods described, since the characteristics/properties of boron or gadolinium tagged proppants do not change over time. It should be noted that any possible confusion caused by changes in formation and/or fracture hydrogen index between two or more post-fracture compensated neutron logs could be dealt with in the same way as in the situation involving the pre-fracture and post-fracture logs as previously described herein.

The foregoing description and embodiments are intended to illustrate the invention without limiting it thereby. It will be obvious to those skilled in the art that the invention described herein can be essentially duplicated by making minor changes in the material content or the method of manufacture. To the extent that such material or methods are substantially equivalent, it is intended that they be encompassed by the following claims.

The invention claimed is:

1. For use in a subterranean formation traversed by a borehole, a method of determining the presence of a high thermal neutron capture cross section-containing proppant in the formation, the method comprising the steps of: moving a logging tool through a length of the borehole along the formation, the logging tool having (1) a neutron emitting source, (2) a plurality of thermal neutron or capture gamma ray logging detectors located at different distances from the neutron source, and, during operation of the logging tool, generating (3) a plurality of detector count rates, and (4) a detector count rate ratio of two of the detector count rates; establishing a first predetermined relationship between a detector count rate and a hydrogen index of the formation without proppant therein, establishing a second predetermined relationship between the detector count rate ratio and a hydrogen index of the formation without proppant therein; utilizing the first predetermined relationship and detector count rates to generate computed first apparent hydrogen index values along the length of the logged formation; utilizing the second predetermined relationship and detector count rate ratios to generate computed second apparent hydrogen index values along the length of the logged formation; and comparing the computed first and second apparent hydrogen index values to identify differentials therein indicative of the presence of proppant in the formation.

2. The method of claim 1 wherein:
the moving step is performed using a compensated neutron logging tool.

3. The method of claim 1 wherein:
the moving step is performed using a pulsed neutron capture logging tool.

4. The method of claim 1 wherein:
in the comparing step the computed first apparent hydrogen index values are higher than the computed second apparent hydrogen index values.

5. The method of claim 1 wherein:
the plurality of logging detectors includes a near detector closer to the neutron emitting source than any other logging detector, and
the logging detector count rate utilized in the step of establishing a first predetermined relationship is the near detector.

6. The method of claim 1 further comprising the step, performed prior to the utilizing steps, of:
comparing computed hydrogen index values obtained using (1) count rates with the first predetermined relationship, and (2) count rate ratios with the second predetermined relationship, along a non-fractured area of the formation, and normalizing the first and second relationships if the computed hydrogen index values obtained using the first predetermined relationship are not substantially identical to the computed hydrogen index values obtained using the second predetermined relationship.

7. The method of claim 6 wherein:
the normalizing step includes the step of adjusting the first predetermined relationship.

8. For use in conjunction with a subterranean formation traversed by a borehole, a well logging method comprising the steps of:
performing across an interval of the well at least one logging operation in each of which a logging tool, having a neutron emitting source and a plurality of thermal neutron or capture gamma ray logging detectors located at different distances from the neutron emitting source, is moved through the borehole and used to generate a detector count rate and a detector count rate ratio of the count rates in two of the detectors; and
utilizing the detector count rate and the detector count rate ratio obtained during the logging operation together to determine the presence of high thermal neutron capture cross section material-containing proppant in the formation and/or the borehole region.

9. The well logging method of claim 8 wherein:
the performing step is performed using a compensated neutron logging tool.

10. The well logging method of claim 8 wherein:
the performing step is performed using a pulsed neutron capture logging tool.

11. The method of claim 8 wherein the detector count rate and count rate ratio are crossplotted, and formations containing high thermal neutron capture cross section material-containing proppant fall in a different region of the crossplot relative to formations that do not contain proppant.

12. The method of claim 11 wherein the formations that do not contain proppant fall along a formation hydrogen index related trend or trendline on the crossplot, and formations containing the proppant do not fall on this trend or trendline.

13. The method of claim 12 wherein the degree of divergence from the trendline is indicative of one or more of the following: (1) the amount of high capture cross section material in the vicinity of the logging tool, (2) the width of the fracture containing the proppant, and/or (3) the inverse of the distance of the proppant from the logging tool.

14. The method of claim 12 wherein the trendline in a crossplot of log data from a pre-frac log being different from the trendline of log data in a post-frac log in zones not containing proppant indicates a change in borehole conditions between the pre-frac and post-frac logs.

15. The method of claim 11 wherein the subterranean formation is a previously fractured subterranean formation, and the method is performed without utilizing any pre-fracture logging data or any logging data obtained during fracturing.

16. The method of claim 11 wherein the count rate and ratio data are corrected for known environmental/borehole effects before the count rate and ratio data are crossplotted.

17. The method of claim 11 wherein the detector used for the count rate measurement is relatively nearer the neutron emitting source in the tool than one or more of the other detectors.

18. The well logging method of claim 11 wherein:
the performing step is performed using a compensated neutron logging tool.

19. The well logging method of claim 11 wherein:
the performing step is performed using a pulsed neutron capture logging tool.

20. The well logging method of claim 8 wherein:
the utilizing step includes the step of comparing the detector count rate of one of the detectors to a detector count rate computed from the count rate ratio.

21. The well logging method of claim 20 wherein:
the computation of the detector count rate from the count rate ratio is based on a relationship/trendline determined between the detector count rate and the count rate ratio in an interval of the well containing no tagged proppant.

22. The well logging method of claim 21 wherein:
the detector count rate and count rate ratio data are corrected for known environmental/borehole effects before any count rates are computed from the count rate ratio.

23. The well logging method of claim 21 wherein:
the borehole conditions in the intervals of the well where the determination is being made of the presence of proppant in the formation and/or the borehole region are similar to the borehole conditions in the interval of the well where the relationship/trendline between the detector count rate and the count rate ratio is determined.

24. The well logging method of claim 20 wherein:
in the comparing step the count rate computed from the count rate ratio is higher than the count rate from one of the detectors.

25. The well logging method of claim 24 wherein:
the amount that the detector count rate computed from the count rate ratio exceeds the detector count rate in one of the detectors is directly related to at least one of the concentration of the high thermal neutron capture cross section material in the proppant, the width of the fracture, and the inverse of the radial extent of the proppant.

26. The well logging method of claim 20 wherein:
the subterranean formation is a previously fractured subterranean formation, and
the method is performed without utilizing any pre-fracture logging data or any logging data obtained during fracturing.

27. The well logging method of claim 20 wherein:
the detector used for the count rate measurement is relatively nearer the neutron emitting source in the tool than one or more of the other detectors.

28. The well logging method of claim 20 wherein:
the comparing step comprises creating an overlay log as a function of depth in the well of the detector count rate computed from the count rate ratio with the detector count rate in one of the detectors.

29. The well logging method of claim 28 wherein:
high thermal neutron capture cross section material-containing proppant is indicated in intervals of the well where the detector count rate computed from the count rate ratio exceeds the detector count rate in one of the detectors.

30. The well logging method of claim 29 wherein:
the amount that the detector count rate computed from the count rate ratio exceeds the detector count rate in one of the detectors is directly related to at least one of the concentration of the high thermal neutron capture cross section material in the proppant, the width of the fracture, and the inverse of the radial extent of the proppant.

31. The well logging method of claim 20 wherein:
the performing step is performed using a compensated neutron logging tool.

32. The well logging method of claim 20 wherein:
the performing step is performed using a pulsed neutron capture logging tool.

33. The well logging method of claim 8 wherein:
the formation has been previously fractured, and
the at least one logging operation does not include a logging operation performed before or during the fracturing of the formation.

34. For use in conjunction with a subterranean formation traversed by a borehole, a well logging method comprising the steps of:
performing across an interval of the well at least one logging operation in each of which a logging tool, having a neutron emitting source and a plurality of thermal neutron or capture gamma ray logging detectors located at different distances from the neutron emitting source, is moved through the borehole and used to generate a detector count rate and a detector count rate ratio of the count rates in two of the detectors; and
utilizing the detector count rate and the detector count rate ratio obtained during the logging operation together to determine the presence of high thermal neutron capture cross section material-containing proppant in the formation and/or the borehole region,
the utilizing step including the step of comparing an apparent formation hydrogen index value computed from the detector count rate of one of the detectors to an apparent formation hydrogen index value computed from the count rate ratio.

35. The well logging method of claim 8 wherein the utilizing step includes the steps of: utilizing a first predetermined detector count rate/formation hydrogen index relationship developed in unfractured formations to compute from the detector count rate during the logging operation first apparent formation hydrogen index values across the logged interval, utilizing a second predetermined detector count rate ratio/ formation hydrogen index relationship developed in unfractured formations to compute from the detector count rate ratio during the logging operation second apparent formation hydrogen index values across the interval, and comparing the first and second computed apparent hydrogen index values across the logged interval to identify differentials therein indicative of the presence of proppant in the formation.

36. The well logging method of claim 35 wherein:
in the comparing step the computed first apparent hydrogen index values are higher than the computed second apparent hydrogen index values.

37. The well logging method of claim 35 wherein:
if the compared first and second hydrogen index logs are not substantially identical across the unfractured portion of the interval, the well logging method comprises the further step of relatively adjusting the predetermined relationships to minimize the discrepancy therebetween prior to performing the utilizing step.

38. The well logging method of claim 37 wherein:
the relatively adjusting step is performed by adjusting the predetermined relationship between the detector count rate and the hydrogen index of the formation.

39. For use in conjunction with a subterranean formation traversed by a borehole, a well logging method comprising the steps of:
performing across an interval of the well at least one logging operation in each of which a logging tool, having a neutron emitting source and a plurality of thermal neutron or capture gamma ray logging detectors located at different distances from the neutron emitting source, is moved through the borehole and used to generate a detector count rate and a detector count rate ratio of the count rates in two of the detectors; and
utilizing the detector count rate and the detector count rate ratio obtained during the logging operation together to determine the presence of high thermal neutron capture cross section material-containing proppant in the formation and/or the borehole region,
the at least one logging operation comprising a first logging operation prior to a formation fracturing procedure, and a second, subsequently performed logging operation after proppant has been emplaced in the formation and/or borehole region during the fracturing procedure, and
the well logging method comprising the further steps, performed prior to the utilizing step, of generating a first hydrogen index log for an unfractured portion of the formation in the first or second logging operation, generating a second hydrogen index log for an unfractured portion of the formation in the first or second logging operation, and comparing the first and second hydrogen index logs in the first logging operation or in the second logging operation across the unfractured portions of the formation to verify that they are substantially identical prior to performing the utilizing step.

40. For use in conjunction with a subterranean formation traversed by a borehole, a well logging method comprising the steps of:
performing across an interval of the well at least one logging operation in each of which a logging tool, having a neutron emitting source and a plurality of thermal neutron or capture gamma ray logging detectors located at different distances from the neutron emitting source, is moved through the borehole and used to generate a detector count rate and a detector count rate ratio of the count rates in two of the detectors; and
utilizing the detector count rate and the detector count rate ratio obtained during the logging operation together to determine the presence of high thermal neutron capture cross section material-containing proppant in the formation and/or the borehole region,
the at least one logging operation including first and second logging operations, and
the utilizing step being performed in a manner substantially eliminating proppant determination uncertainty resulting from a change in the formation hydrogen index occurring between the first and second logging operations.

41. For use in conjunction with a subterranean formation traversed by a borehole, a well logging method comprising the steps of:
performing across an interval of the well at least one logging operation in each of which a logging tool, having a neutron emitting source and a plurality of thermal neutron or capture gamma ray logging detectors located at different distances from the neutron emitting source, is moved through the borehole and used to generate a detector count rate and a detector count rate ratio of the count rates in two of the detectors; and
utilizing the detector count rate and the detector count rate ratio obtained during the logging operation together to determine the presence of high thermal neutron capture cross section material-containing proppant in the formation and/or the borehole region, wherein:
the detector count rate and count rate ratio are crossplotted, and formations containing high thermal neutron capture cross section material-containing proppant fall in a different region of the crossplot relative to formations that do not contain proppant, the at least one logging operation includes first and second logging operations, and the utilizing step is performed in a manner substantially eliminating proppant determination uncertainty resulting from a change in the formation hydrogen index occurring between the first and second logging operations.

42. A method of determining the presence of a high thermal neutron capture cross section-containing proppant in a subterranean formation which has been fractured subsequent to a pre-fracture logging run performed using a logging tool having a neutron emitting source, a plurality of thermal neutron or capture gamma ray logging detectors located at different distances from the neutron source, and, during operation of the logging tool, generating a plurality of detector count rates, and a detector count rate ratio of two of the detector count rates, the method comprising the steps of: computing, for the pre-fracture logging run through the formation, a pre-fracture first hydrogen index log using a first predetermined relationship between the detector count rate and the hydrogen index of the pre-fracture formation, and a pre-fracture second hydrogen index log using a second predetermined relationship between the detector count rate ratio and the hydrogen index of the pre-fracture formation; adjusting the relationship between hydrogen index and detector count rate, if the computed pre-fracture first and second hydrogen index logs do not agree, until agreement between the computed pre-fracture first and second hydrogen index logs is optimized; utilizing, in conjunction with a post-fracture logging run through the formation, a post-fracture predetermined detector count rate/hydrogen index relationship to compute a post-fracture first hydrogen index log, and a post-fracture predetermined detector count rate ratio/hydrogen index relationship to compute a post-fracture second hydrogen index log; and determining whether, outside the interval(s) of possible fracturing in the post-fracture formation, the post-fracture first hydrogen index log is in agreement with the post-fracture second hydrogen index log.

43. The method of claim 42 wherein:
the post-fracture predetermined detector count rate/hydrogen index relationship is identical to the pre-fracture first predetermined relationship between the detector count rate and the hydrogen index of the pre-fracture formation, and the post-fracture predetermined detector count rate ratio/hydrogen index relationship is identical to the pre-fracture second predetermined relationship between the detector count rate ratio and hydrogen index of the pre-fracture formation, and if, outside the interval(s) of possible fracturing in the post-fracture formation, the post-fracture first hydrogen index log is in agreement with the post-fracture second hydrogen index log, the method further comprises the step of identifying areas of separation between the post-fracture first and second hydrogen index logs within the interval of possible fracturing indicative of the presence of proppant in the post-fracture formation and/or borehole region.

44. The method of claim 43 wherein:
the method has a proppant detection accuracy of which is substantially unaffected by changes in the hydrogen index of the formation between the pre-fracture logging run and the post-fracture logging run.

45. The method of claim 42 wherein if, outside the interval(s) of possible fracturing in the post-fracture formation, the post-fracture first hydrogen index log is not in agreement with the post-fracture second hydrogen index log, the method further comprises the steps of:

using predetermined relationships based on post-fracture log data to compute a first post-fracture log data-based hydrogen index log using a detector count rate, and to compute a second post-fracture log data-based hydrogen index log using a detector count rate ratio, adjusting the relationship between hydrogen index and the detector count rate for the first post-fracture log data-based hydrogen index log if the computed first and second post-fracture log data-based hydrogen index logs do not agree in areas of the post-fracture formation outside potential fracture areas therein, until agreement between the first and second post-fracture log data-based hydrogen index logs is optimized in areas outside the interval of possible fracturing, and identifying areas of separation between the first and second post-fracture log data-based hydrogen index logs within the interval of possible fracturing indicative of the presence of proppant in the post-fracture formation and/or borehole region.

46. The method of claim 45 wherein:
the method has a proppant detection accuracy which is substantially unaffected by changes in the hydrogen index of the formation between the pre-fracture logging run and the post-fracture logging run.

47. A method of determining the presence of a high thermal neutron capture cross section-containing proppant in a previously fractured subterranean formation through which a borehole extends, the method comprising the steps of:

moving a logging tool through the borehole, the logging tool having a neutron emitting source and a plurality of thermal neutron or capture gamma ray logging detectors located at different distances from the neutron emitting source, the logging tool being operative to generate a detector count rate and a detector count rate ratio;

using predetermined relationships to compute first and second hydrogen index logs respectively from the detector count rate and from the detector count rate ratio;

determining whether, outside the interval(s) of possible fracturing in the formation, the post-fracture first hydrogen index log is in agreement with the post-fracture second hydrogen index log and, if they are not, relatively adjusting them to optimize their agreement; and identifying within the interval of possible fracturing areas of separation between the first and second hydrogen index logs indicative of the presence of proppant in the formation.

48. The method of claim 47 wherein:
the method is performed without utilizing any pre-fracture logging data or any logging data obtained during fracturing.

49. A well logging method comprising the steps of
moving a logging tool through a subterranean formation; and utilizing predetermined relationships (1) between logging tool count rates and associated apparent formation hydrogen index values, and (2) between logging tool count rate ratios and associated apparent formation hydrogen index values, to detect the presence and heights in the formation of proppant containing high thermal neutron capture cross section material in a manner substantially eliminating proppant determination uncertainty resulting from a prior change in formation hydrogen index values.

50. A method of determining the presence of a high thermal neutron capture cross section-containing proppant in a previously fractured subterranean formation through which a borehole extends, the method comprising the steps of:

moving a logging tool through an interval of the borehole, the logging tool having a neutron emitting source and a plurality of thermal neutron or capture gamma ray logging detectors located at different distances from the neutron emitting source, the logging tool being operative to generate a detector count rate and a detector count rate ratio;

computing a crossplot of data from the detector count rate and from the detector count rate ratio across the interval;

determining a formation hydrogen index related trend / trendline in the crossplotted data representative of formations which do not contain high thermal neutron absorbing material-containing proppant;

identifying on the crossplot data which does not lie on the trend / trendline; and determining the presence of proppant in the formation and/or borehole at depths/zones on the log associated with those data points on the crossplot that do not lie on the trend / trendline.

51. The method of claim 50 wherein:

the method is performed without utilizing any pre-fracture logging data or any logging data obtained during fracturing.

52. For use in conjunction with a subterranean formation traversed by a borehole, a well logging method comprising the steps of:

performing across an interval of the well at least one logging operation in each of which a logging tool, having a neutron emitting source and a plurality of thermal neutron or capture gamma ray logging detectors located at different distances from the neutron emitting source, is moved through the borehole and used to generate a detector count rate and a detector count rate ratio of the count rates in two of the detectors; and utilizing the detector count rate and the detector count rate ratio obtained during the logging operation together to determine the presence of high thermal neutron capture cross section material-containing proppant in the formation and/or the borehole region, the utilizing step including the step of comparing the detector count rate of one of the detectors to a detector count rate computed from the count rate ratio, the utilizing step being performed in a manner substantially eliminating proppant determination uncertainty resulting from a change in the formation hydrogen index occurring between pre-fracture and post-fracture logging operations.

* * * * *